US009003889B2

(12) United States Patent
Yoshida et al.

(10) Patent No.: US 9,003,889 B2
(45) Date of Patent: Apr. 14, 2015

(54) RESONANT PRESSURE SENSOR AND METHOD OF MANUFACTURING THE SAME

(75) Inventors: Yuusaku Yoshida, Musashino (JP); Takashi Yoshida, Musashino (JP); Hiroshi Suzuki, Musashino (JP); Shuhei Yoshita, Musashino (JP); Hisashi Terashita, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 246 days.

(21) Appl. No.: 13/593,311

(22) Filed: Aug. 23, 2012

(65) Prior Publication Data

US 2013/0047734 A1 Feb. 28, 2013

(30) Foreign Application Priority Data

Aug. 25, 2011 (JP) ................ 2011-183857

(51) Int. Cl.
*G01L 11/00* (2006.01)
*G01L 9/00* (2006.01)

(52) U.S. Cl.
CPC ............. *G01L 9/0016* (2013.01); *G01L 9/0045* (2013.01)

(58) Field of Classification Search
USPC .................................. 73/700–756
See application file for complete search history.

(56) References Cited

U.S. PATENT DOCUMENTS 3,278,882 A * 10/1966 Love .................................. 338/2
5,123,282 A * 6/1992 Ikeda et al. ..................... 73/704
5,959,213 A * 9/1999 Ikeda et al. ..................... 73/720
2007/0063297 A1 3/2007 Takada et al.
2007/0089525 A1* 4/2007 Momose et al. ................ 73/753
2011/0232387 A1* 9/2011 Sakurai ........................... 73/702
2014/0157892 A1* 6/2014 Matsuzawa et al. ............ 73/384

FOREIGN PATENT DOCUMENTS

| CN | 1651886 A | 8/2005 |
| CN | 1936591 A | 3/2007 |
| CN | 1974372 A | 6/2007 |
| JP | 61-502365 A | 10/1986 |
| JP | 1-171337 U | 12/1989 |

(Continued)

OTHER PUBLICATIONS

Seijiro Furukawa, "SOI Structure Forming Technique", issued from Sangyotosho on Oct. 23, 1987, pp. 259.

(Continued)

*Primary Examiner* — Andre Allen
(74) *Attorney, Agent, or Firm* — Sughrue Mion, PLLC

(57) ABSTRACT

A resonant pressure sensor including one or more resonant-type strain gauges arranged on a diaphragm may include a sensor substrate made of silicon and including one surface on which one or more resonant-type strain gauge elements are arranged and the other surface which is polished to have a thickness corresponding to the diaphragm, a base substrate made of silicon and including one surface directly bonded with the other surface of the sensor substrate, a concave portion formed in a portion of the base substrate bonding with the sensor substrate, substantially forming the diaphragm in the sensor substrate, and including a predetermined gap that does not restrict a movable range of the diaphragm due to foreign substances and suppresses vibration of the diaphragm excited by vibration of the resonant-type strain gauge elements, one or more conducting holes, and a fluid.

24 Claims, 16 Drawing Sheets

(56) References Cited

FOREIGN PATENT DOCUMENTS

| | | |
|---|---|---|
| JP | 02-032224 A | 2/1990 |
| JP | 4-502203 A | 4/1992 |
| JP | 04-206663 A | 7/1992 |
| JP | 06-244438 A | 9/1994 |
| JP | 07-130591 A | 5/1995 |
| JP | 11-148879 A | 6/1999 |
| JP | 11-298009 A | 10/1999 |
| JP | 2003-031818 A | 1/2003 |
| JP | 2009-111164 A | 5/2009 |
| WO | 85/05737 A1 | 12/1985 |
| WO | 90/04701 A1 | 5/1990 |

OTHER PUBLICATIONS

"Chemical Effect Mechanism in Chemical Mechanical Polishing for Silicon Wafer", Zhi-gang Chen, etc., No. 2 of vol. 31 of Semiconductor Technology, pp. 112-115, Feb. 28, 2006.

* cited by examiner

RESONANT PRESSURE SENSOR AND METHOD OF MANUFACTURING THE SAME

BACKGROUND OF THE INVENTION

1. Field of the Invention

The present invention relates to a resonant pressure sensor. More specifically, the present invention relates to a resonant pressure sensor which is high in measurement accuracy, simple to fabricate, and low in cost.

Priority is claimed on Japanese Patent Application No. 2011-183857, filed Aug. 25, 2011, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

FIG. 13 is an explanatory diagram illustrating a main part of a resonant pressure sensor in accordance with the related art, which is disclosed, for example, in Japanese Unexamined Utility Model Application, First Publication No. H01-171337. Referring to FIG. 13, a silicon diaphragm 11 and a fixed portion 111 of the silicon diaphragm 11 are arranged in a predetermined fluid 112. In this case, silicone oil is used as the fluid 112.

In this case, each of resonant-type strain gauges 12 has an H shape. FIG. 13 illustrates a cross section of a portion in the vicinity of an H-shaped fixed end of the resonant-type strain gauges 12. A magnet 13 includes a yoke 131 and a permanent magnet 132. The yoke 131 functions as a vibration suppressor. The vibration suppressor (the yoke 131) is disposed such that at least one surface of the diaphragm 11 is close to one surface of the vibration suppressor (the yoke 131) so that the silicon diaphragm 11 does not resonate with the resonant-type strain gauge 12 due to density and viscosity of the fluid 112 between the diaphragm 11 and the vibration suppressor (the yoke 131).

A concave portion 113 is formed by the silicon diaphragm 11 and the fixed portion 111 of the silicon diaphragm.

A silicon substrate 40 forms a chamber 114 together with the concave portion 113. One surface of the silicon substrate 40 is fixed to one surface of the fixed portion 111 of the silicon diaphragm. A pressure-conducting hole 141 is provided in the silicon substrate 40 and conducts pressure into the chamber 114.

One surface of a pressure-conducting joint 50 is adjacent to and fixed to the silicon substrate 40 via a spacer 42 provided in an external opening portion of the pressure-conducting hole 141 so that the fixed portion 111 of the silicon diaphragm does not resonate with the resonant-type strain gauge 12 due to density and viscosity of the fluid 112 between the silicon substrate 40 and the pressure-conducting joint 50.

In this case, the spacer 42 is configured integrally with the silicon substrate 40. A through hole 51 is formed in the pressure-conducting joint 50, and is connected to the pressure-conducting hole 141 of the silicon substrate 40. A cover 60 is configured to cover the magnet 13, the diaphragm 11, the fixed portion 111, the substrate 40, and the spacer 42, and attached to the pressure-conducting joint 50. The inside of the cover 60 is filled with the fluid 112.

In the above-described configuration, when external pressure is applied to the diaphragm 11, the natural frequency of the resonant-type strain gauge 12 changes according to the external pressure. A vibration of the resonant-type strain gauge 12 is detected by a vibration detecting unit, and a detected frequency is extracted as an output signal.

As a result, the external pressure applied to the diaphragm 11 can be detected. Further, since the vibration suppressor 131 is provided, and one surface of the vibration suppressor 131 is provided to be adjacent to at least one surface of the diaphragm 11, the silicon diaphragm 11 does not resonate with the resonant-type strain gauge 12.

In other words, the diaphragm 11 has a resonant frequency depending on its shape but the resonant amplitude is suppressed by the silicone oil 112 in a gap between the diaphragm 11 and the yoke 131. Thus, even when an oscillating frequency of the resonant-type strain gauge 12 matches the resonant frequency of the diaphragm 11, the diaphragm 11 can be prevented from resonating. For example, in this example, this condition is sufficiently satisfied when a gap between the yoke 131 and the diaphragm 11 in silicone oil of 100 cs is smaller than 0.1 mm.

FIG. 14 illustrates an example in which a relation between Q and the gap a of the diaphragm 11 is actually measured in various kinds of fluids. It can be seen that when Q is smaller than 0.7, there is no substantial influence of resonance of the diaphragm 11. Here, A represents the case when the fluid 112 is air. B represents the case when the fluid 112 is Freon. C represents the case when the fluid 112 is silicone oil.

FIG. 15 is an explanatory diagram illustrating a main part of a resonant pressure sensor in accordance with the related art, which is disclosed in, for example, Japanese Unexamined Patent Application, First Publication No. H02-032224. Referring to FIG. 15, a damping base 19 made of single crystalline silicon is received in a concave portion 11. A flow hole 20 is formed at the center. A bottom portion of the flow hole 20 bonds with a base chip 16 in a thermal oxidation manner to be connected to a through hole 15.

A predetermined gap Δ is maintained between an upper portion of the damping base 19 and a bottom portion of a diaphragm 13. Since silicone oil 21 is sealed inside the concave portion 11, influence of a resonant-type strain gauge 14 is damped by the narrow gap Δ and thus removed.

FIGS. 16 to 23 are explanatory diagrams illustrating a main part of a resonant pressure sensor in accordance with the related art, which is disclosed in, for example, Japanese Unexamined Patent Application, First Publication No. H06-244438. First, as illustrated in FIG. 16, a spinel epitaxial layer 12 is formed on one surface side of a semiconductor substrate 11. Next, as illustrated in FIG. 17, an oxide silicon film 13 is formed between the semiconductor substrate 11 and the spinel epitaxial layer 12.

The spinel epitaxial layer is described in, for example, "SOI Structure Forming Technique," p. 259, written by Seijiro Furukawa, issued from Sangyotosho on Oct. 23, 1987. The spinel epitaxial layer 12 is a film taking over the crystallographic structure from the semiconductor substrate 11. Next, as illustrated in FIG. 18, a poly-silicon layer 14 is formed on the surface of the spinel epitaxial layer 12, and the poly-silicon layer 14 is converted into a single crystalline layer by an annealing process.

Then, as illustrated in FIG. 19, portions of the poly-silicon layer 14, the spinel epitaxial layer 12, and the oxide silicon film 13 are removed through a photolithography technique and an etching technique such as a reactive ion etching (RIE) technique. A reference numeral 15 denotes a resist.

Next, as illustrated in FIG. 20, a silicon epitaxial growth layer 16 is formed on the surfaces of the semiconductor substrate 11 and the poly-silicon layer 14. Next, as illustrated in FIG. 21, a strain detecting sensor 17 is formed on the silicon epitaxial growth layer 16. In this case, a piezo-resistive element is formed.

Next, as illustrated in FIG. 22, the other surface of the semiconductor substrate 11 is etched up to the oxide silicon film 13 to form a conducting hole 18. Next, as illustrated in FIG. 23, the oxide silicon film 13 is removed by performing selective etching through the conducting hole 18. As a result, the diaphragm and a gap chamber are formed.

In short, in this kind of resonant pressure sensor, as pressure is applied to the diaphragm, the diaphragm is deformed. As the diaphragm is deformed, deformation occurs in the resonant-type strain gauge, and thus the resonant frequency of the resonant-type strain gauge changes. The pressure applied to the diaphragm can be measured by detecting the frequency change.

In the resonant pressure sensor using the resonant-type strain gauge, the resonant-type strain gauge is self-excited using an external circuit, and thus it is preferable that energy supplied from the circuit be used only for vibration of the resonant-type strain gauge.

However, part of energy input to the resonant-type strain gauge is expended as resonance energy of the diaphragm at a frequency at which the resonant frequency of the diaphragm is the same as the self-excitation frequency of the resonant-type strain gauge. As a result, since the Q value of the resonant-type strain gauge element is lowered, characteristics such as input/output characteristics worsen. As a method of solving this problem, a technique of suppressing resonance of a diaphragm using a narrow gap filled with oil has been proposed.

As concrete examples for implementing this technique, a method of arranging a machined part at a side at which the resonant-type strain gauge is arranged and forming a gap (Japanese Unexamined Utility Model Application, First Publication No. H01-171337), a method of arranging a convex portion in a part facing a concave portion of a diaphragm (Japanese Unexamined Patent Application, First Publication No. H02-032224), and a method of etching an oxide layer and forming a gap (Japanese Unexamined Patent Application, First Publication No. H06-244438) have been proposed.

As a manufacturing method in accordance with the related arts, particularly, as a method of forming a diaphragm, there are a method of forming a diaphragm using deep alkaline etching described in Japanese Unexamined Utility Model Application, First Publication No. H01-171337 and Japanese Unexamined Patent Application, First Publication No. H02-032224 and a method of forming a diaphragm using an oxide film described in Japanese Unexamined Patent Application, First Publication No. H06-244438 as an etching stopper.

FIG. 24 is an explanatory diagram illustrating a main part of a resonant pressure sensor in accordance with the related art. In the method of forming a diaphragm using deep alkaline etching, a single crystalline wafer 101 is subjected to anisotropic wet etching to form a diaphragm 102 to a desired thickness. The thickness is controlled based on an etching rate and an etching time. In this technique, as illustrated in FIG. 24, a concave portion configured with a surface (111) 103 is formed.

In the method of forming a diaphragm using an oxide film described in Japanese Unexamined Patent Application, First Publication No. H06-244438 as an etching stopper, etching by an alkaline solution and plasma etching are used, but since an oxide film can be used as an etching stopper, the film thickness can be controlled with a higher degree of accuracy than the method using deep alkaline etching.

However, the above-mentioned methods have the following problems. In the technique disclosed in Japanese Unexamined Utility Model Application, First Publication No. H01-171337, since a diaphragm is formed using deep alkaline etching, it is difficult to control the thickness of several μm to several tens of μm in units of μm, and thus it is difficult to suppress a variation in sensitivity.

Further, since a gap is formed using a machined part, it is difficult to form a small gap of several tens of μm or less with a high degree of accuracy, and there is a limitation to suppressing resonance of a diaphragm. Further, since a machined part is used, a foreign substance may be mixed in when a gap is formed. In this case, a movable range of a diaphragm is limited, and thus characteristics such as input/output characteristics may be affected. In addition, it is difficult to freely select the shape of a diaphragm due to influence of crystal surface orientation by alkaline etching when a diaphragm is formed. For this reason, there is a design restriction to the shape of a diaphragm, and it is difficult to design the shape of a diaphragm with flexibility.

In the technique disclosed in Japanese Unexamined Patent Application, First Publication No. H02-032224, since a diaphragm is formed using deep alkaline etching, it is difficult to control the thickness of several μm to several tens of μm in unit of μm. Further, when a gap is formed, it is difficult to process a concave portion by alkaline etching with a high degree of accuracy, and a processing error of a facing convex part lowers the accuracy. Thus, it is difficult to form a gap of several μm with a high degree of accuracy, and there is a limitation to suppressing resonance of a diaphragm.

Further, it is difficult to freely select the shape of a diaphragm due to influence of crystal surface orientation by alkaline etching when a diaphragm is formed. Thus, when a diaphragm is designed, there is a restriction to the shape of a diaphragm, and it is difficult to design a diaphragm with a flexible shape.

In the technique disclosed in Japanese Unexamined Patent Application, First Publication No. H06-244438, since an oxide film is used to form a gap, stress occurs in the boundary between an oxide film and silicon, and a wafer may be bent or an oxide film cracked. The limit of the oxide film thickness to avoid this state is about 3 μm to about 4 μm, and thus it is difficult to form a gap of about 3 μm to about 4 μm or more.

For this reason, a movable range of a diaphragm is restricted by a gap, and there is a restriction on a design of a sensor with a pressure range in which displacement of 4 μm or more is necessary. Further, a diaphragm is formed by epitaxial growth and is affected by a crystal surface. Thus, in order to form a diaphragm having high breaking stress with no crystal defect in a boundary portion between a substrate and a diaphragm, a design needs to be made in consideration of a crystal surface. For this reason, it is difficult to design a diaphragm with a flexible shape which is not restricted by crystal orientation.

Next, among the fabricating methods in accordance with the related arts, particularly, a problem of a method of forming a diaphragm will be described. The deep alkaline etching described in Japanese Unexamined Utility Model Application, First Publication No. H01-171337 and Japanese Unexamined Patent Application, First Publication No. H02-032224 have the following problems. First, the deep alkaline etching is easily affected by the temperature of a chemical, and thus it is difficult to control the thickness. Further, even though an etching amount is large, the accuracy required for a film thickness of a diaphragm is high, and thus it is difficult to control. In addition, at the time of etching, it is necessary to protect an element surface from a chemical.

Meanwhile, in the method using an oxide film as an etching stopper, which is described in Japanese Unexamined Patent Application, First Publication No. H06-244438, a gap is formed depending on the thickness of the oxide film. For this reason, it is difficult to form a gap of about 3 μm to 4 μm or more that causes a wafer to be bent or an oxide film to be cracked. In this case, the diaphragm comes into contact with an opposite structure, and a movable range of the diaphragm is restricted. In other words, there is large restriction on the design of a sensor with a pressure range in which displacement of 4 μm or more is necessary.

FIG. 25 is an explanatory diagram illustrating a main part of a resonant pressure sensor in accordance with the related art. In the deep alkaline etching, as illustrated in FIG. 25, when a diaphragm forming process is performed at the same diaphragm thickness with the mask of the same shape, diaphragms having different finished shapes are formed in wafers that differ in the thickness due to the difference in an etching speed in the plane orientation.

For this reason, wafers that differ in inch size have different thicknesses, and thus it is necessary to change an etching condition or a mask pattern. This means that after a prototype wafer having a small inch size such as 4 inches is fabricated in a research and development phase, in order to commercialize and mass-produce a wafer having a large inch size such as 8 inches or 12 inches, it is necessary to make a mask again and change a manufacturing condition. Thus, in order to migrate from trail production to commercialization, an extraordinary amount of time is inevitably expended.

In addition, in the pressure sensor, the shape and the thickness of a diaphragm need to be designed again according to a pressure range. In order to implement diaphragms of diverse thicknesses corresponding to various pressure ranges by deep alkaline etching, a mask pattern and a fabricating condition need to be individually managed and manufactured for each thickness of a diaphragm.

Further, even the diaphragm fabricated using the epitaxial growth discussed in Japanese Unexamined Patent Application, First Publication No. H06-244438 is affected by the plane orientation, and thus it is difficult to design the flexible shape which is not restricted by crystal orientation.

SUMMARY

The present invention provides a resonant pressure sensor and a method of fabricating the same.

The structure of the resonant pressure sensor including resonant type strain gauges has the following features:

1) A structure in which a variation in sensitivity can be suppressed and controllability of a thickness of a diaphragm is excellent.

2) A structure in which a gap (submicron to several tens of μm or more) to prevent resonance of a diaphragm can be implemented with submicron accuracy.

3) A structure in which a diaphragm having no restriction on a shape by the crystal surface can be designed.

The method of fabricating the resonant pressure sensor including resonant type strain gauges has the following features:

1) A fabricating method of a resonant pressure sensor that does not depend on a wafer inch size.

2) A fabricating method of a resonant pressure sensor in which even diaphragms with different thicknesses can be fabricated by the same mask.

3) A fabricating method of a resonant pressure sensor including a diaphragm with uniform sensitivity that is small in a thickness variation of a diaphragm.

4) A fabricating method of a resonant pressure sensor capable of fabricating a small gap to suppress resonance of a diaphragm.

5) A fabricating method of a resonant pressure sensor of a simple process in which a prior process to complete resonant-type strain gauge elements is not included in a process after a grinding/polishing process and a bonding process.

A resonant pressure sensor including one or more resonant-type strain gauges arranged on a diaphragm may include: a sensor substrate that is made of silicon and includes one surface on which one or more resonant-type strain gauge elements are arranged and the other surface which is polished to have a thickness corresponding to the diaphragm; a base substrate that is made of silicon and includes one surface directly bonded with the other surface of the sensor substrate; a concave portion that is formed in a portion of the base substrate that bonds with the sensor substrate, substantially forms the diaphragm in the sensor substrate, and includes a predetermined gap that does not restrict a movable range of the diaphragm due to foreign substances and suppresses vibration of the diaphragm excited by vibration of the resonant-type strain gauge elements; one or more conducting holes that conduct measuring pressure to the concave portion; and a fluid that propagates pressure to the concave portion through the conducting hole and suppress vibration of the diaphragm.

A resonant pressure sensor including one or more resonant-type strain gauges arranged on a diaphragm may include: a sensor substrate that is made of silicon and includes one surface on which one or more resonant-type strain gauge elements are arranged and the other surface which is polished to have a thickness corresponding to the diaphragm; a base substrate that is made of silicon and includes one surface directly bonded with the other surface of the sensor substrate; a concave portion that is formed in a portion of the sensor substrate that bonds with the base substrate, substantially forms the diaphragm in the sensor substrate, and includes a predetermined gap that does not restrict a movable range of the diaphragm due to foreign substances and suppresses vibration of the diaphragm excited by vibration of the resonant-type strain gauge element; one or more conducting holes that conduct measuring pressure to the concave portion; and a fluid that propagates pressure to the concave portion through the conducting hole and suppresses vibration of the diaphragm.

Bonding between the sensor substrate and the base substrate may be performed without using an oxide film or any other dissimilar material.

The concave portion may be formed by one of plasma etching and wet etching.

A shape of the concave portion may be one of quadrangular shape, a circular shape, and a polygonal shape.

The concave portion may be a small gap of less than 1 μm to several tens of μm or less.

A method of fabricating a resonant pressure sensor in which one or more resonant-type strain gauges are formed in a diaphragm may include: forming resonant-type strain gauge elements on one surface of a sensor wafer; attaching the surface of the sensor wafer to one surface of a support wafer; grinding and polishing the other surface of the sensor wafer to have a thickness corresponding to a diaphragm; forming a concave portion having a predetermined gap in one surface of a base wafer; directly bonding the other surface of the sensor wafer with one surface of the base wafer; detaching the support wafer from the sensor wafer; and dicing the bounded wafer.

A method of fabricating a resonant pressure sensor in which one or more resonant-type strain gauges are formed in a diaphragm may include: forming resonant-type strain gauge elements on one surface of a sensor wafer; attaching the surface of the sensor wafer to one surface of a support wafer; grinding and polishing the other surface of the sensor wafer to have a thickness corresponding to a diaphragm; forming a concave portion having a predetermined gap in one surface of the sensor wafer; directly bonding the other surface of the sensor wafer with one surface of the base wafer; detaching the support wafer from the sensor wafer; and dicing the bounded wafer.

The bounding of the sensor wafer to the base wafer may be performed without using an oxide film or any other dissimilar material.

The forming of the concave portion may be performed by one of plasma etching and wet etching.

A shape of the concave portion may be one of quadrangular shape, a circular shape, and a polygonal shape.

The concave portion may be a small gap of less than 1 μm to several tens of μm or less.

According to the present invention, the following effects are obtained. The polishing amount can be adjusted for each wafer in consideration of a thickness variation of each wafer. Thus, the thickness of the diaphragm can be easily controlled, for example, with submicron to micron accuracy. Thus, the resonant pressure sensor capable of suppressing a variation in sensitivity is provided. Since a dissimilar material is not used for bonding, the bonding portion can have a breaking strength equal to a base material strength of silicon. Thus, the resonant pressure sensor having a breakage pressure-resistance characteristic is provided.

Further, since thermal distortion caused by a difference in a thermal expansion coefficient is suppressed, the resonant pressure sensor having excellent temperature characteristics is provided. Further, the resonant pressure sensor in which an internal residual strain between dissimilar materials caused by temperature and pressure history is suppressed, and the structure having no hysteresis can be implemented is provided.

A gap of several tens of μm or less can be formed between the concave portion of the base substrate and the diaphragm. Thus, the resonant pressure sensor in which the resonance of the diaphragm can be prevented, the movable range of diaphragm is not restricted due to foreign substances, and characteristics such as excellent input output characteristics is provided. Since an etching amount to form the gap of the concave portion of the base substrate is small, the resonant pressure sensor which is high in accuracy and excellent in controllability of a gap is provided.

The shape of the concave portion (for example, several tens of μm or less) of the base substrate becomes the shape of the diaphragm as is. Thus, compared to the case the diaphragm is formed by performing deep anisotropic etching using an alkaline solution from the back surface of the wafer on which an element is formed, the size or the shape of a diaphragm is not restricted by the crystal surface (111). Accordingly, it is possible to fabricate the flexible shape such as the circular shape which is not restricted by the crystal orientation. Particularly, when isotropic etching using plasma is used, the resonant pressure sensor that is simple in a fabricating process, low in cost, and high uniformity in sensitivity is provided.

According to the present invention, the following effects are obtained. The polishing amount can be adjusted for each wafer in consideration of a thickness variation of each wafer. Thus, the thickness of the diaphragm can be easily controlled, for example, with the submicron to micron accuracy. Thus, the resonant pressure sensor capable of suppressing a variation in sensitivity is provided. Since a dissimilar material is not used for bonding, the bonding portion can have a breaking strength equal to a base material strength of silicon. Thus, the resonant pressure sensor having a breakage pressure-resistance characteristic is provided.

Further, since thermal distortion caused by a difference in a thermal expansion coefficient is suppressed, the resonant pressure sensor having excellent temperature characteristics is provided. Further, the resonant pressure sensor in which an internal residual strain between dissimilar materials caused by temperature and pressure history is suppressed, and the structure having no hysteresis can be implemented is provided.

For example, a gap of several tens of μm or less can be formed between the concave portion of the sensor substrate formed on the polished surface side of the diaphragm and the base substrate. Thus, the resonant pressure sensor in which the resonance of the diaphragm can be prevented, the movable range of diaphragm is not restricted due to foreign substances, and characteristics such as input output characteristics are excellent is provided. Since an etching amount to form the gap of the concave portion of the sensor substrate is small, the resonant pressure sensor which is high in accuracy and excellent in controllability of a gap is provided.

The shape of the concave portion (for example, several tens of μm or less) of the sensor substrate becomes the shape of the diaphragm as is. Thus, compared to when the diaphragm is formed by performing deep anisotropic etching using an alkaline solution from the back surface of the substrate on which an element is formed, the size or the shape of a diaphragm is not restricted by the crystal surface (111). Accordingly, it is possible to fabricate the flexible shape which is not restricted by the crystal orientation such as the circular shape. Particularly, when isotropic etching using plasma is used, the fabricating process can be simplified, and a stress-concentrated portion on the periphery of the diaphragm can be rounded, so that the breakage pressure-resistance increases. Accordingly, the resonant pressure sensor which is low in cost and high in sensitivity is provided.

According to the present invention, the following effects are obtained. Since the thickness of the diaphragm is substantially decided by the grinding/polishing process, unlike the deep alkaline etching, a mask variation for the difference in the diaphragm shape caused by the depth of alkaline etching is unnecessary. Unlike alkaline etching, even when a wafer having a large inch size (8 inches, 12 inches, or the like) is used for the commercialization using a trial fabrication result by a wafer having a small inch size (a 4-inch wafer or the like), the same mask pattern and the same process can be applied, and thus transfer to mass production can be efficiently performed. Thus, the fabricating method of the resonant pressure sensor that does not depend on an inch size is provided.

The polishing amount can be adjusted for each wafer in consideration of a thickness variation of each wafer. Thus, the thickness can be easily controlled with the accuracy of units of several μm, unlike deep alkaline etching. For this reason, the fabricating method of the resonant pressure sensor in which a diaphragm has uniform sensitivity is provided. Since the gap is decided according to the depth of the concave portion of the base wafer which is small in etching amount, for example, a gap of several tens of μm to less than 1 μm can be easily fabricated. Further, since the etching amount is small, the accuracy can be controlled with a high degree of submicron accuracy. As a result, the fabricating method of the resonant pressure sensor capable of fabricating the small gap to suppress resonance of the diaphragm in a state in which controllability is excellent is provided.

The process of fabricating the diaphragm in which silicon wafers bond directly with each other at near room temperature such as the room-temperature direct bonding process or the metal diffusion bonding process is performed at a temperature lower than a heat-resistance temperature of a metallic interconnection formed on the sensor wafer. Thus, the bonding process can be performed in a state in which the metallic interconnection process of the resonant-type strain gauge elements has been completed. Further, even with requests to change the shape or the thickness of the diaphragm according to the pressure range, the diaphragm using the above-described bonding process can be formed by the same mask and the same process without depending on the shape or the thickness of the diaphragm.

The low-temperature bonding has many other advantages. Generally, when the high-temperature process of 800° C. or more is executed after the resonant-type strain gauge, redistribution of impurity elements, rearrangement of atoms, or re-crystallization may occur, and thus device characteristics of a sensor may be degraded. The process of fabricating a diaphragm such that the room-temperature direct bonding process or the metal diffusion bonding process can be performed at a temperature of, for example, about 400° C. or less, and thus a creep of silicon or thermal distortion that adversely affects characteristics of a pressure sensor does not remain. Thus, it is possible to implement the fabricating method of the resonant pressure sensor having excellent characteristics.

According to the present invention, the following effects are obtained. Since the thickness of the diaphragm is substantially decided by the grinding/polishing process, unlike the deep alkaline etching, a mask variation for the difference in the diaphragm shape caused by the deep alkaline etching is unnecessary. Unlike alkaline etching, even when a wafer having a large inch size (8 inches, 12 inches, or the like) is used for the commercialization using a trial fabrication result by a wafer having a small inch size (a 4-inch wafer or the like), the same mask pattern and the same process can be applied, and thus transfer to mass production can be efficiently performed. Thus, the fabricating method of the resonant pressure sensor that does not depend on an inch size is provided.

The polishing amount can be adjusted for each wafer in consideration of a thickness variation of each wafer. Thus, the thickness can be easily controlled with micron accuracy, unlike the deep alkaline etching. For this reason, the fabricating method of the resonant pressure sensor in which a diaphragm has uniform sensitivity is provided. Since the gap is decided according to the depth of the concave portion of the sensor wafer which is small in etching amount, for example, a gap of several tens of μm to less than 1 μm can be easily fabricated. Further, since the etching amount is small, the accuracy can be controlled with a high degree of submicron accuracy. As a result, the fabricating method of the resonant pressure sensor capable of fabricating the small gap to suppress resonance of the diaphragm in a state in which controllability is excellent is provided.

In addition, when isotropic etching using plasma is used, the fabricating process can be simplified, and a stress-concentrated portion on the periphery of the diaphragm can be rounded, so that the breakage pressure-resistance increases. Accordingly, the resonant pressure sensor which is low in cost and high in sensitivity is provided.

The process of fabricating the diaphragm in which silicon wafers bond directly with each other at near room temperature such as the room-temperature direct bonding process or the metal diffusion bonding process is performed at a temperature lower than a heat-resistance temperature of a metallic interconnection formed on the sensor wafer. Thus, the bonding process can be performed in a state in which the metallic interconnection process of the resonant-type strain gauge elements has been completed. Further, even with requests to change the shape or the thickness of the diaphragm according to the pressure range, the diaphragm using the above-described bonding process can be formed by the same mask and the same process without depending on the shape or the thickness of the diaphragm.

Generally, when the high-temperature process of 800° C. or more is executed after the resonant-type strain gauge, redistribution of impurity elements, rearrangement of atoms, or re-crystallization may occur, and thus device characteristics of a sensor may be degraded. The process of fabricating a diaphragm such that the room-temperature direct bonding process or the metal diffusion bonding process can be performed at a temperature of, for example, about 400° C. or less, and thus a creep of silicon or thermal distortion that adversely affects characteristics of a pressure sensor does not remain. Thus, it is possible to implement the fabricating method of the resonant pressure sensor having excellent characteristics.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

First Preferred Embodiment

Figure 1:
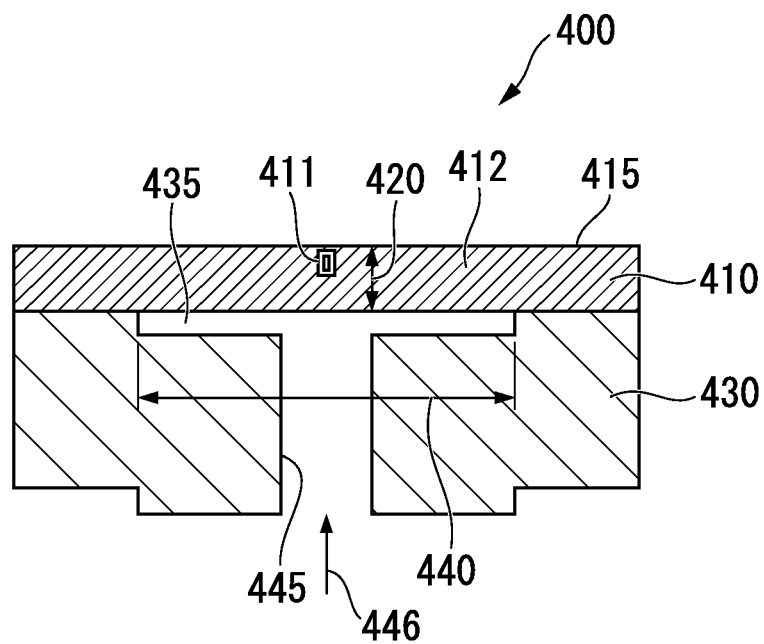
FIG. 1 is an explanatory diagram illustrating a configuration of a resonant pressure sensor in accordance with a first preferred embodiment of the present invention.
Figure 2:
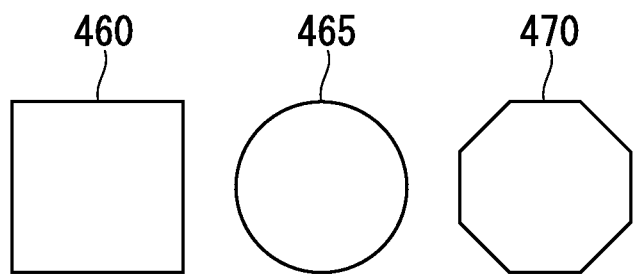
FIG. 2 is an explanatory diagram illustrating shapes of the diaphragm illustrated in FIG. 1.

FIG. 1 is an explanatory diagram illustrating a configuration of a resonant pressure sensor in accordance with a first preferred embodiment of the present invention. FIG. 2 is an explanatory diagram illustrating shapes of the diaphragm illustrated in FIG. 1.

The resonant pressure sensor includes a sensor substrate 410 and a base substrate 430. The sensor substrate 410 and the base substrate 430 are made of silicon. Resonant-type strain gauge elements 411 are disposed on one surface of the sensor substrate 410, and the other surface of the sensor substrate 410 remains polished at the thickness corresponding to a diaphragm 412. The other surface of the sensor substrate 410 bonds directly with one surface of the base substrate 430.

A concave portion 435 is formed in a portion of the base substrate 430 that bonds with the sensor substrate 410. The concave portion 435 substantially forms the diaphragm 412 in the sensor substrate 410. The concave portion 435 has a predetermined gap in which the movable range of the diaphragm 412 is not restricted by foreign substances, and a damping effect is applied to resonance of the diaphragm 412 excited by vibration of the resonant-type strain gauge element 411 combined with a fluid 446 which will be described later.

A conducting hole 445 conducts measuring pressure to the concave portion 435. The fluid 446 propagates pressure to the concave portion 435 through the conducting hole 445 and suppress vibration of the diaphragm 412.

In other words, the resonant pressure sensor 400 is configured with the sensor substrate 410 and the base substrate 430. The conducting hole 445 is formed in the base substrate 430 by plasma etching, alkaline etching, or the like. The hole may have any shape to the extent of a conducting hole. The resonant-type strain gauge element 411 is fabricated on an upper surface 415 of the diaphragm 412.

The thickness 420 of the diaphragm is decided depending on the thickness of the sensor substrate 410. For this reason, the thickness 420 of the diaphragm is adjusted such that grinding/polishing is performed up to a desired thickness. Since the polishing amount can be finely adjusted for each wafer, the thickness of each wafer can be controlled in units of μm with a high degree of accuracy. The sensor substrate 410 and the base substrate 430 are made of silicon, and bonding of the substrates is performed without using an oxide film or any other dissimilar material. For this reason, a breaking strength equal to a base material strength of silicon can be realized even on the bonded interface. In addition, the resonant pressure sensor 400 having excellent temperature characteristics can be implemented.

The concave portion 435 of the base substrate 430 serves as a gap 435 formed by bonding. The concave portion 435 is formed by plasma etching, wet etching, or the like. Since the concave portion 435 need not be subjected to deep etching using an alkaline chemical (KOH, TMAH, and the like), a gap of less than 1 μm to several tens of μm or less can be formed with a high degree of accuracy. Thus, a degree of freedom can be given to a design of a gap in which foreign substances are considered or a design of a gap in which the movable range of the diaphragm 412 is considered. The dimension of the diaphragm 412 can be set to the dimension 440 of the concave portion 435 of the base substrate 430.

A quadrangular shape 460, a circular shape 465, a polygonal shape 470, or the like may be used as a concrete shape of the concave portion 435 as illustrated in FIG. 2. Since the concave portion 435 of the base substrate 430 is a small gap of less than 1 μm to several tens of μm or less, there is no restriction on the size in a substrate in-plane direction by an etching surface, unlike a method of forming a diaphragm by deep etching using an alkaline chemical (KOH, TMAH, or the like). Thus, the shape of the concave portion 435 can be freely designed without being restricted by the crystal orientation of the diaphragm.

Figure 3:
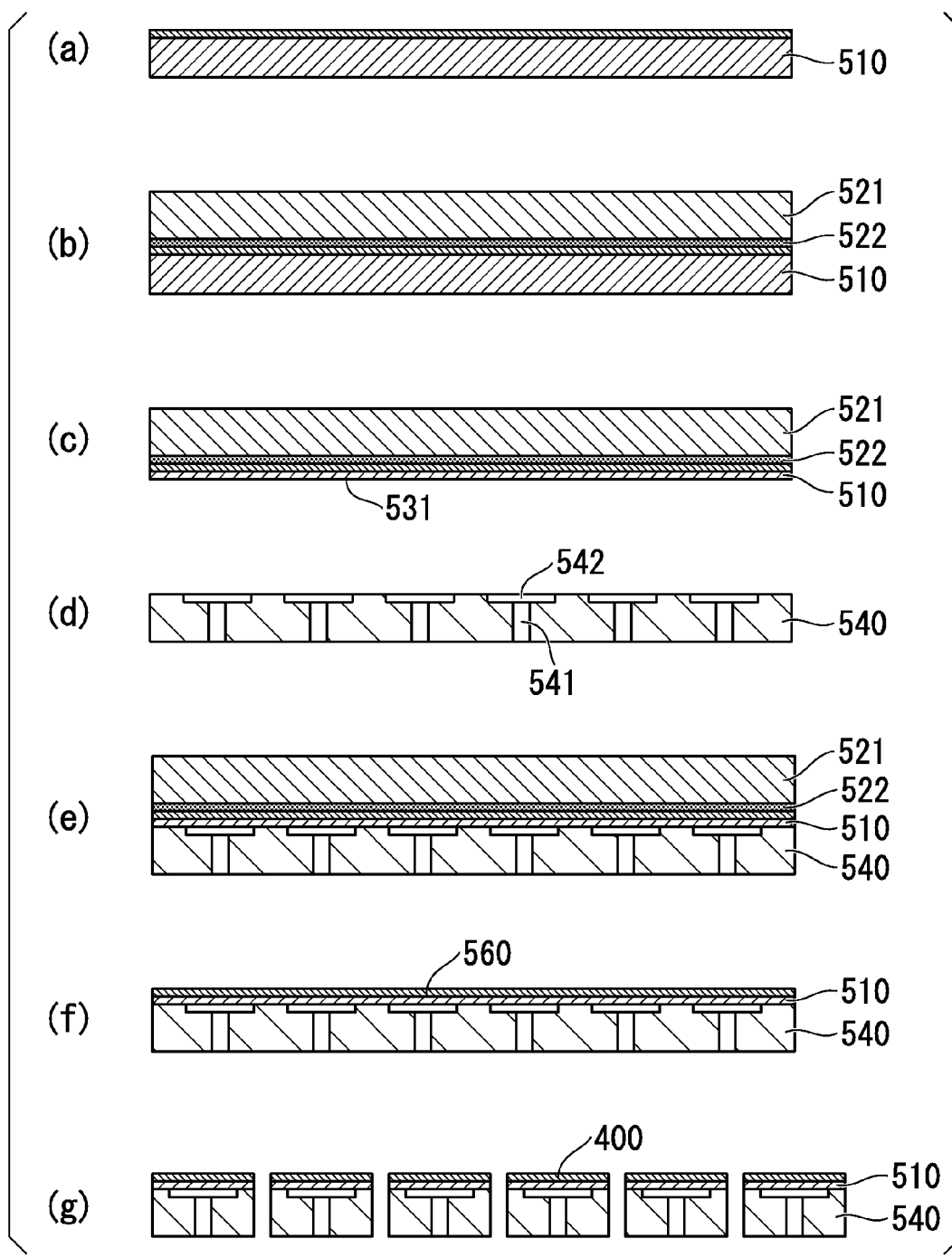
FIGS. 3 (a) to 3(g) are explanatory diagrams illustrating a process of fabricating the resonant pressure sensor illustrated in FIG. 1 in accordance with the first preferred embodiment of the present invention.
Figure 4:
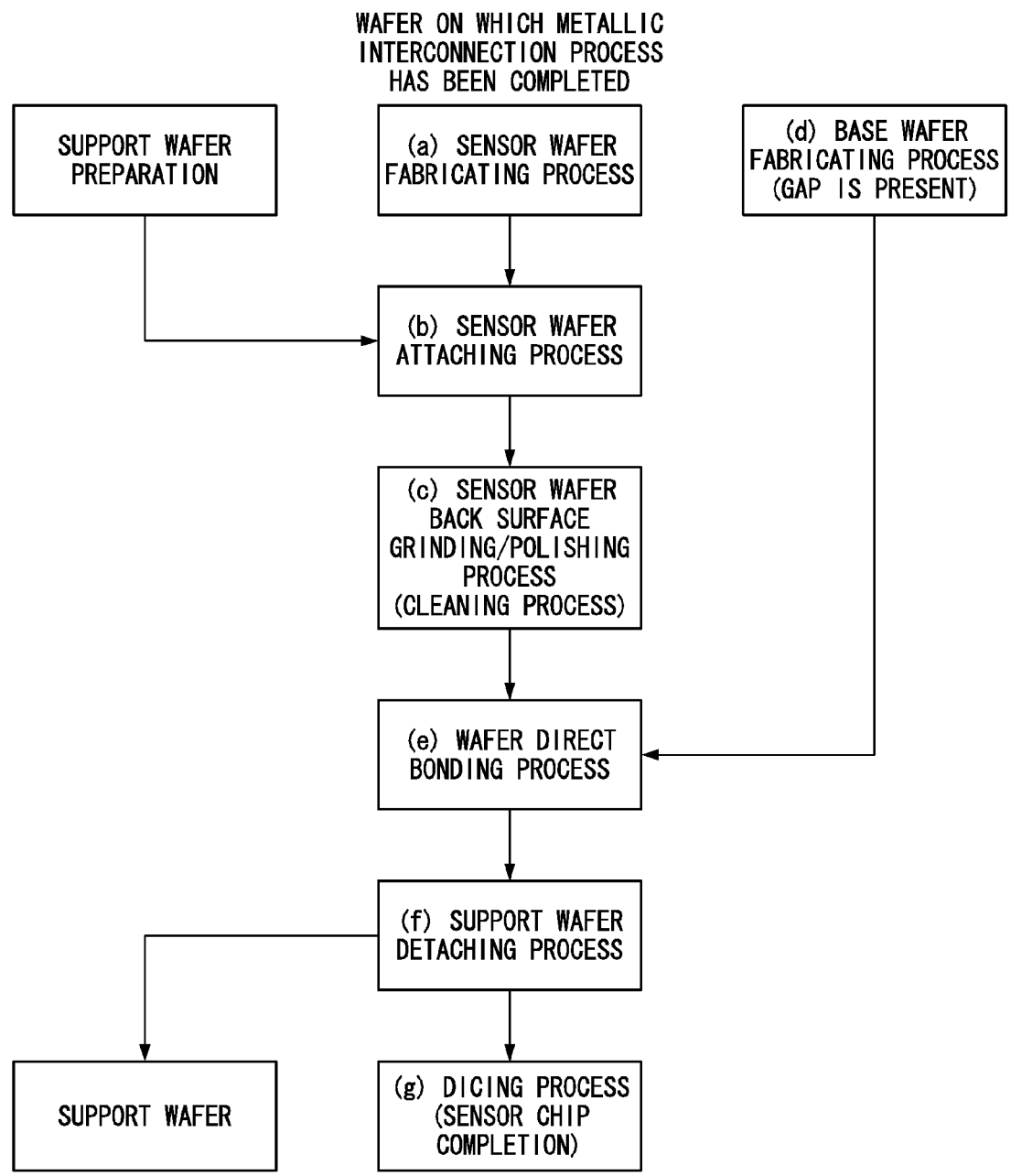
FIG. 4 is an explanatory diagram illustrating a process flowchart of the fabricating process illustrated in FIG. 3.

FIG. 3 is an explanatory diagram illustrating a process of fabricating the resonant pressure sensor illustrated in FIG. 1 in accordance with the first preferred embodiment of the present invention. FIG. 4 is an explanatory diagram illustrating a process flowchart of the fabricating process illustrated in FIG. 3. (a) to (g) in FIG. 3 represent the same processes as (a) to (g) in FIG. 4, respectively.

FIG. 3(a) represents a process of fabricating a sensor wafer 510. The sensor wafer 510 which has been subjected to this process includes the resonant-type strain gauge element 411 formed on one surface thereof. That is, the sensor wafer 510 is a wafer on which the resonant-type strain gauge element 411 and a metallic interconnection have already been formed. In other words, since processing of the surface on which the resonant-type strain gauge element 411 has already been completed, the processing in a subsequent process is unnecessary. Further, since the resonant-type strain gauge element 411 is too small to indicate, an arrangement area of the resonant-type strain gauge element 411 is indicated by hatching different from the sensor wafer 510.

FIG. 3(b) illustrates a process of attaching the sensor wafer. A support wafer 521 is attached to an element surface of the sensor wafer 510 using an attachment material 522. Examples of the attachment material 522 include a thermoplastic adhesive, a chemical solution type adhesive, a UV adhesive, a double-sided tape, and a WAX. Since the attachment accuracy affects a variation in thickness in a subsequent grinding/polishing process, it is necessary to control a total thickness variation (TTV) (a difference between a minimum value and a maximum value of a wafer in-plane thickness) and bending. The support wafer 521 is made of a material such as sapphire, glass, silicon, and the like. The shape of the support wafer is not particularly limited.

FIG. 3(c) illustrates a process of grinding/polishing a back surface of the sensor wafer. A surface 531, which is the side opposite to the resonant-type gauge element 411, of the sensor wafer 510 attached to the support wafer 521 is ground/polished up to a desired thickness. At this time, polishing should be executed until a fracture layer or a grinding mark formed at the grinding process disappears.

In the sensor wafer 510 whose thickness is reduced, a concavo-convex pattern of the resonant-type strain gauge element 411 appears on the ground/polished surface which has been subjected to grinding/polishing as a concavo-convex pattern. The concavo-convex pattern of the ground/polished surface incurs a non-bonding portion at the time of bonding or incurs bonding distortion in a sensor. Thus, it is desirable to planarize the concavo-convex pattern of the element surface of the sensor wafer 510. Further, when the sensor wafer 510 is ground/polished to be 100 μm or less, a wafer easily gets cracked when handled in units of wafers. However, in a state in which the support wafer 521 is attached, handling is possible even in the sensor wafer 510 of several tens of μm or less.

After grinding/polishing, it is preferable that a cleaning process (not shown) be executed to increase cleanliness of the ground/polished surface. For example, physical cleaning ($CO_2$ cleaning or two-fluid cleaning) or acid and alkali cleaning is executed as the cleaning process. The cleaning process is executed at a temperature equal to or less than a heat-resistant temperature of an attachment material, and it is necessary to use a chemical against which the material has chemical resistance.

FIG. 3(d) illustrates a process of fabricating a base wafer. A pressure-conducting hole 541 and a concave portion 542 are formed in a base wafer 540. The base wafer 540 can be subjected to any technique capable of forming the pressure-conducting hole 541 such as plasma etching or wet etching. The hole can have any shape appropriate for a conducting hole. Similarly, the concave portion 542 is formed using plasma etching, wet etching, or the like.

FIG. 3(e) illustrates a process of directly bonding wafers. The base wafer 540 on which the pressure-conducting hole 541 and the concave portion 542 are formed bonds with the ground/polished sensor wafer 510 attached to the support wafer 521. At this time, it is necessary to bond the base wafer 540 with the sensor wafer 510 at a temperature equal to or less than a heat-resistant temperature of an attachment material.

Specifically, a maximum temperature of an adhesive is about 100° C. to about 200° C., and is about 150° C. in the case of a double-sided tape. From a point of view of simplifying the process, it is desirable to execute the bonding process in a state in which a film forming process or a modifying process has not yet been performed on the ground/polished surface. Examples of a bonding process satisfying this condition include a room-temperature direct bonding process and a metal diffusion bonding process.

The room-temperature direct bonding process is performed under high vacuum condition, after etching surfaces for the activation of bonding surfaces of wafers by an ion gun or a fast atomic beam FAB gun. A feature of this technique lies in that a bonding process is performed at room temperature, and the surface is suitable for bonding of silicon. Further, gas emitted from an attachment material is attached to the surface again and causes bonding force to be significantly lowered. Thus, a material that does not emit gas should be selected as the attachment material.

The metal diffusion bonding process refers to a technique of attaching an atomic level metal layer on a substrate surface instead of increasing surface activity by etching as in the room-temperature direct bonding process. Similarly to the room-temperature direct bonding process, the bonding process is performed under high vacuum. In this bonding process, since a dissimilar material is very thinly attached at an atomic layer level, bonding can be performed without degrading characteristics of the pressure sensor.

Besides the above-mentioned techniques, a plasma activation bonding technique is used as a low-temperature bonding technique. The plasma activation bonding is performed such that in a state in which an OH group is arranged on the surface by plasma using a gas such as Ar, $N_2$, and $O_2$, surfaces are provisionally bonded (simply attached) to each other, and then bonding strength is increased by annealing at a temperature of about 400° C. In this technique, $H_2O$ generated at the time of bonding causes a void. However, in the structure having a small bonding area such as a diaphragm, $H_2O$ leaves the bonding interface, and excellent bonding causing no void can be implemented even when bonding silicon to silicon.

FIG. 3(f) illustrates a process of detaching the support wafer. The base wafer 540 and the sensor wafer 510 which is polished to a thin thickness and then directly bonded to the base wafer 540 are separated from the support wafer 521. A method of detaching the support wafer 521 differs according to a used adhesive. For example, in a thermoplastic adhesive, detaching is performed by sliding the support wafer in a state in which heat is applied. Further, in a thermal detaching-type double-sided tape, detaching can be simply performed by applying heat. Although not shown, after detaching, in order to remove a residue of the attachment material, it is desirable to clean the sensor element surface by spin cleaning, chemical immersion, or the like.

FIG. 3(g) illustrates a dicing process. As a final process on a wafer, a process of dicing a bonded wafer 560 from which the support wafer 521 is removed is performed. As a result, the resonant pressure sensor 400 is completed.

As a result, since the thickness of the diaphragm 412 is adjusted according to the grinding/polishing amount, the thickness can be finely adjusted for each wafer. For example, the thickness of the diaphragm can be easily controlled with micron to submicron accuracy. Accordingly, the resonant pressure sensor in which a variation in sensitivity can be suppressed is provided. Since a dissimilar material is not used for bonding, the bonding portion can have a breaking strength equal to a base material strength of silicon. Thus, the resonant pressure sensor having excellent breakage pressure-resistance characteristics is provided.

Further, since thermal distortion caused by a difference in a thermal expansion coefficient is suppressed, the resonant pressure sensor having excellent temperature characteristics is provided. Further, the resonant pressure sensor in which an internal residual strain between dissimilar materials caused by temperature and pressure history is suppressed, and the structure having no hysteresis can be implemented is provided.

Since it is possible to decide a gap according to the depth of the concave portion of the base substrate 540, for example, a gap of several tens of μm or less can be formed between the concave portion 435 of the base substrate and the diaphragm 412. Thus, the resonant pressure sensor in which the resonance of the diaphragm 412 can be prevented, the movable range of diaphragm is not restricted due to foreign substances, and characteristics such as input output characteristics are excellent is provided.

The shape of the concave portion (for example, several tens of μm or less) of the base substrate 430 becomes the shape of the diaphragm 412 as is. Thus, compared to the case the diaphragm is formed by performing deep anisotropic etching using an alkaline solution from the back surface of the wafer on which the resonant-type strain gauge 411 is formed, the size or the shape of a diaphragm is not restricted by the crystal surface (111). Accordingly, it is possible to fabricate a flexible shape which is not restricted by the crystal orientation such as a circular shape. Particularly, when etching using plasma is used, the resonant pressure sensor which is simple in a fabricating process, low in cost, and high uniformity in sensitivity is implemented.

In addition, since the thickness of the diaphragm 412 is substantially decided by the grinding/polishing process, unlike the deep alkaline etching, a method of fabricating a resonant pressure sensor, which does not need a mask variation for the difference in the diaphragm shape caused by the depth of etching is unnecessary, is provided. Unlike alkaline etching, even when a wafer having a large inch size (8 inches, 12 inches, or the like) is used for the commercialization using a trial fabrication result by a wafer having a small inch size (a 4-inch wafer or the like), the same mask pattern and the same process can be applied, and thus transfer to mass production can be efficiently performed.

Thus, a method of fabricating a resonant pressure sensor without depending on an inch size of a wafer is provided. Similarly, even with requests to change the shape or the thickness of the diaphragm 412 according to the pressure range, the diaphragm using the above-described bonding process can be formed by the same mask and the same process without depending on the shape or the thickness of the diaphragm 412.

The process of fabricating a diaphragm in which silicon wafers bond directly with each other such as the room-temperature direct bonding process or the metal diffusion bonding process is performed at a temperature lower than a heat-resistance temperature of a metallic interconnection formed on the sensor wafer 510. Thus, the bonding process can be performed in a state in which the metallic interconnection process of the resonant-type strain gauge elements has been first completed.

Further, the process of fabricating a diaphragm such that the room-temperature direct bonding process or the metal diffusion bonding process can be performed at a temperature of, for example, about 400° C. or less. Thus, a creep of silicon or thermal distortion that affects characteristics of a pressure sensor does not remain. Thus, it is possible to implement a method of fabricating a resonant pressure sensor having excellent characteristics.

Second Preferred Embodiment

Figure 5:
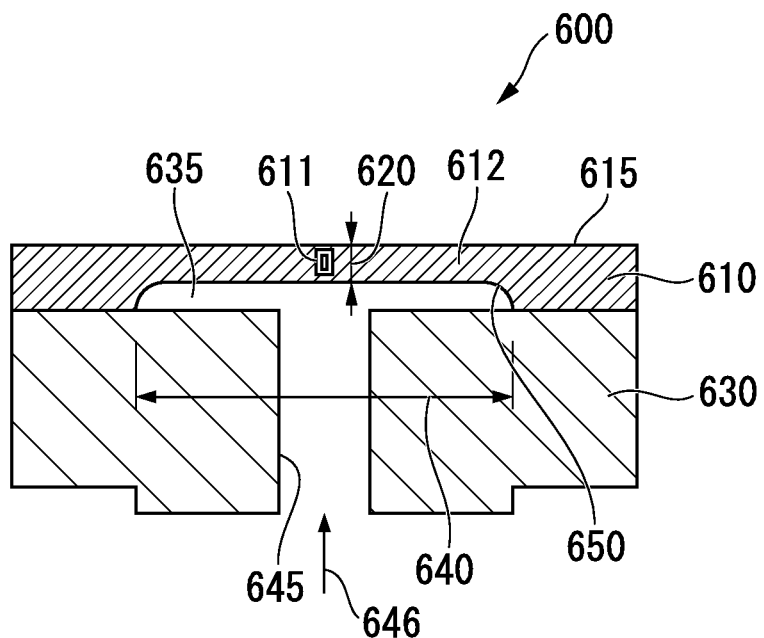
FIG. 5 is an explanatory diagram illustrating a configuration of a resonant pressure sensor in accordance with a second preferred embodiment of the present invention.
Figure 6:
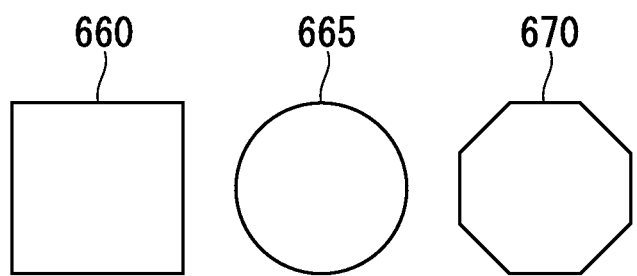
FIG. 6 is an explanatory diagram illustrating shapes of the diaphragm illustrated in FIG. 5.

FIG. 5 is an explanatory diagram illustrating a configuration of a resonant pressure sensor in accordance with a second preferred embodiment of the present invention. FIG. 6 is an explanatory diagram illustrating shapes of the diaphragm illustrated in FIG. 5.

The resonant pressure sensor includes a sensor substrate 610 and a base substrate 630. The sensor substrate 610 and the base substrate 630 are made of silicon. Resonant-type strain gauge elements 611 are disposed on one surface of the sensor substrate 610, and the other surface of the sensor substrate 610 is polished at the thickness corresponding to a diaphragm 612 to form a concave portion 635. The other surface of the sensor substrate 610 bonds directly with one surface of the base substrate 630.

The concave portion 635 is formed in a portion of the sensor substrate 610 that bonds with the base substrate 630. The concave portion 635 substantially forms the diaphragm 612 in the sensor substrate 610. The concave portion 635 has a predetermined gap in which the movable range of the diaphragm 612 is not restricted by foreign substances, and a damping effect is applied to resonance of the diaphragm 612 excited by vibration of the resonant-type strain gauge element 611 by a fluid 646 which will be described later.

A conducting hole 645 conducts measuring pressure to the concave portion 635. The fluid 646 propagates pressure to the concave portion 635 through the conducting hole 645 and suppress variation of the diaphragm 612.

In other words, the resonant pressure sensor 600 is configured with the sensor substrate 610 and the base substrate 630. A conducting hole 645 is formed in the base substrate 630 by plasma etching, alkaline etching, or the like. The hole can have any shape appropriate for a conducting hole. The resonant-type strain gauge element 611 is fabricated on an upper surface 615 of the diaphragm 612.

The thickness 620 of the diaphragm is decided by a value obtained by subtracting an etching amount by which the back surface of the sensor substrate 610 is etched to form the concave portion 635 from the thickness of the sensor substrate 610. For this reason, the accuracy of the thickness of the diaphragm 612 is represented by the sum of the micron accuracy of grinding/polishing and the submicron accuracy of etching, and thus has micron processing accuracy.

The sensor substrate 610 and the base substrate 630 are made of silicon, and bonding of the substrates is performed without using an oxide film or any other dissimilar material. For this reason, breaking strength equal to base material strength of silicon can be realized even on the bonded interface. In addition, a sensor having excellent temperature characteristics can be implemented.

Further, for etching of the concave portion 635 of the sensor substrate 610, a rounding portion 650 formed using isotropic etching is used, and thus stress concentration of the diaphragm 612 can be dispersed. As a result, breakage pressure-resistance of a sensor increases. The concave portion 635 of the sensor substrate bonds with the base substrate 630, so that a gap is formed. The concave portion 635 is formed by plasma etching, wet etching, or the like.

Since the concave portion 635 need not be subjected to deep etching using an alkaline chemical (KOH, TMAH, and the like), a gap of less than 1 μm to several tens of μm or less can be formed with a high degree of accuracy. Thus, a degree of freedom can be given to a design of a gap in which foreign substances are considered or a design of a gap in which the movable range of the diaphragm 612 is considered. A dimension of the diaphragm 612 can be set to a dimension 640 of the concave portion 635 of the sensor substrate 610.

A quadrangular shape 660, a circular shape 665, a polygonal shape 670, or the like may be used as a concrete shape of the concave portion 635 as illustrated in FIG. 6. Since the concave portion 635 of the sensor substrate 610 is a small gap of less than 1 μm to several tens of μm or less, there is no restriction on the size in a substrate in-plane direction by an etching surface, unlike a method of forming a diaphragm by deep etching using an alkaline chemical (KOH, TMAH, or the like). Thus, the shape of the concave portion 635 can be freely designed without being restricted by the crystal orientation of the diaphragm.

Figure 7:
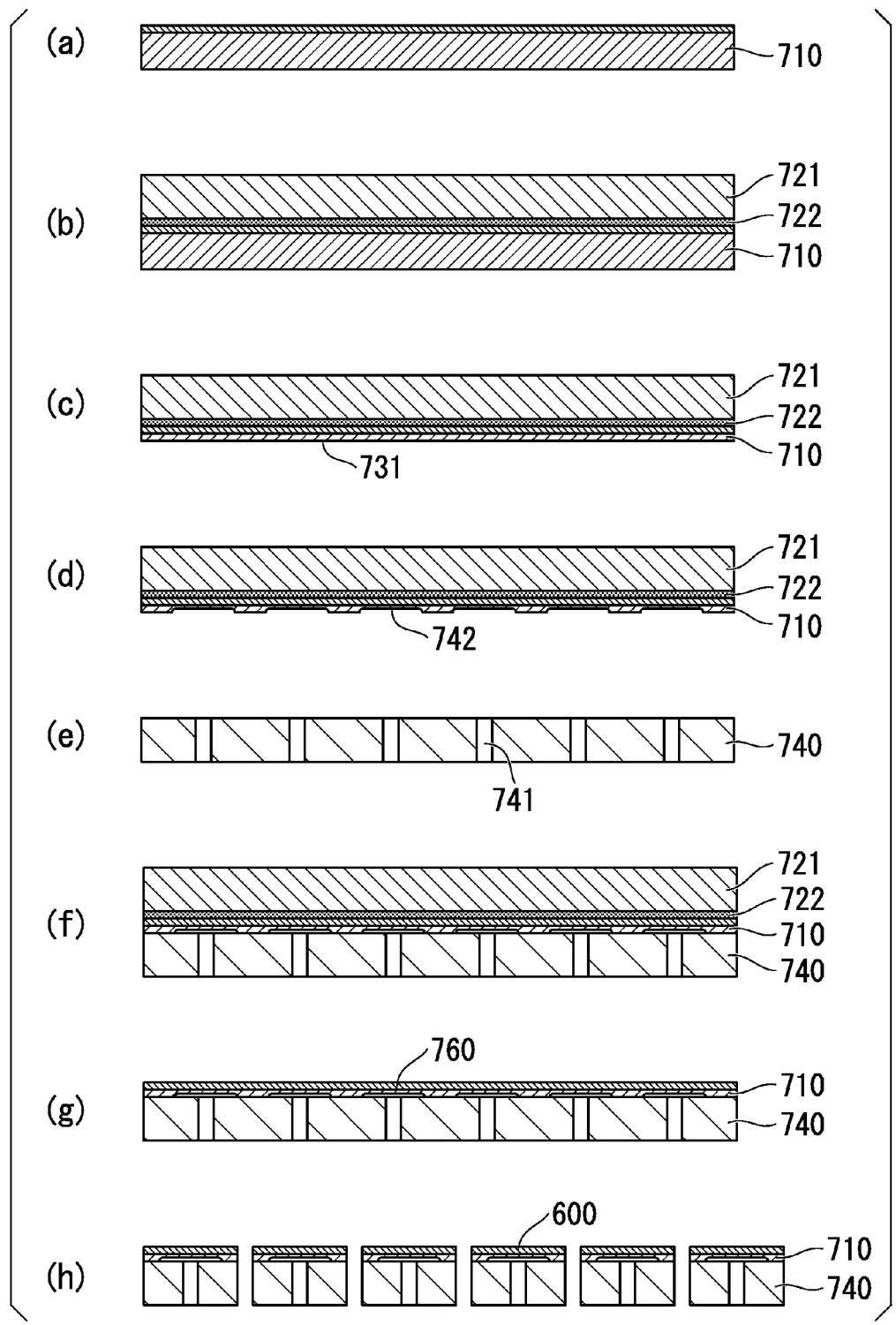
FIGS. 7(a) to 7(h) are explanatory diagrams illustrating a process of fabricating the resonant pressure sensor illustrated in FIG. 5 in accordance with the second preferred embodiment of the present invention.
Figure 8:
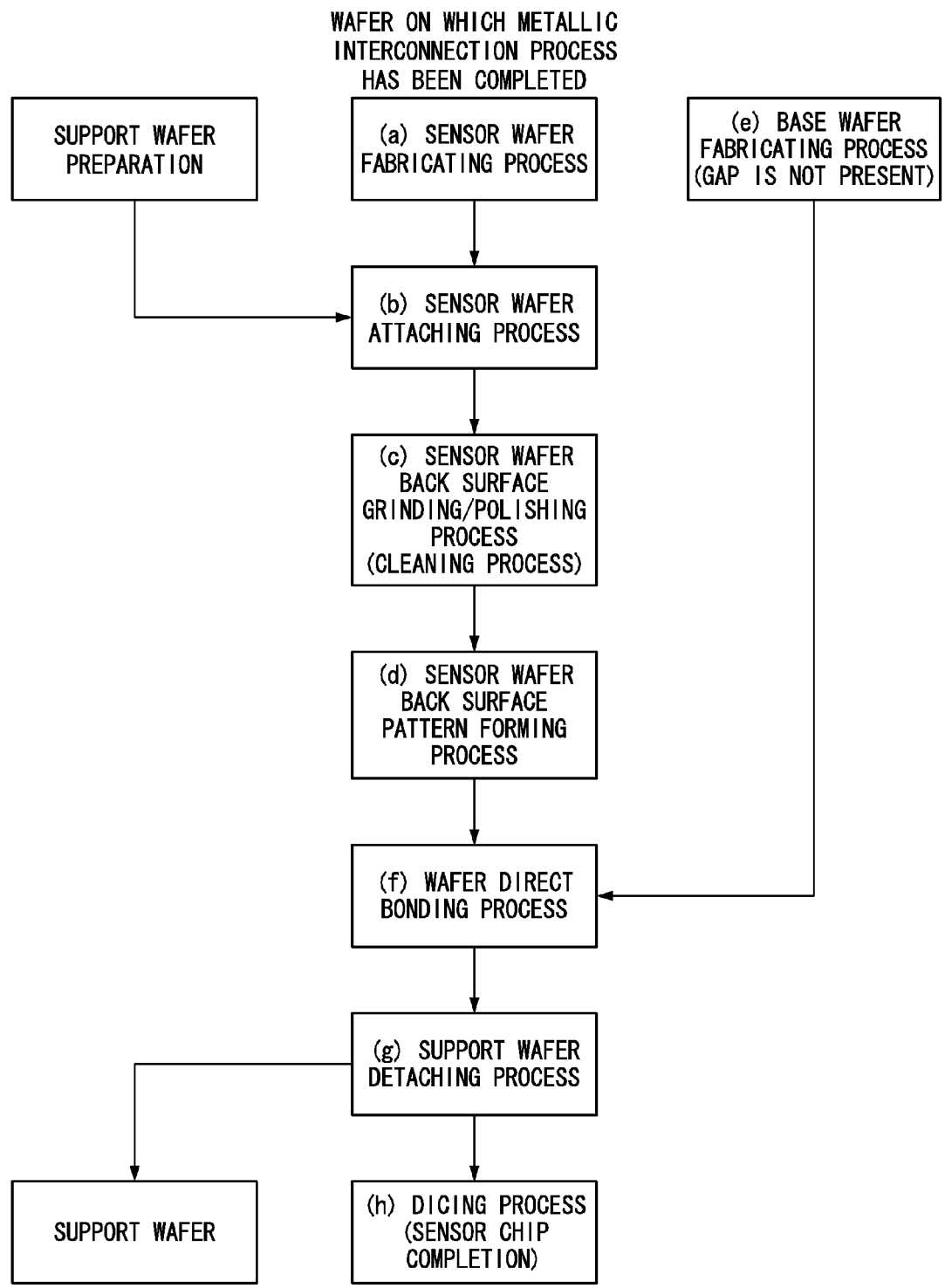
FIG. 8 is an explanatory diagram illustrating a process flowchart of the fabricating process illustrated in FIG. 7.

FIG. 7 is an explanatory diagram illustrating a process of fabricating the resonant pressure sensor illustrated in FIG. 5 in accordance with the second preferred embodiment of the present invention. FIG. 8 is an explanatory diagram illustrating a process flowchart of the fabricating process illustrated in FIG. 7. (a) to (h) in FIG. 7 represent the same processes as (a) to (h) in FIG. 8.

FIG. 7(a) represents a process of fabricating a sensor wafer 710. The sensor wafer 710 which has been subjected to this process includes the resonant-type strain gauge 611 formed on one surface thereof. That is, the sensor wafer 710 is a wafer on which the resonant-type strain gauge element 611 and a metallic interconnection have already been formed. In other words, since processing of the surface on which the resonant-type strain gauge element 611 is disposed has already been completed, the processing in a subsequent process is unnecessary.

FIG. 7(b) illustrates a process of attaching the sensor wafer 710. A support wafer 721 is attached to an element surface of the sensor wafer 710 using an attachment material 722. Examples of the attachment material 722 include a thermoplastic adhesive, a chemical solution type adhesive, a UV adhesive, a double-sided tape, and a WAX.

Since the attachment accuracy affects a variation in thickness in a subsequent grinding/polishing process, it is necessary to control a TTV (a difference between a minimum value and a maximum value of a wafer in-plane thickness) and bending. The support wafer 721 is made of a material such as sapphire, glass, silicon, and the like. The shape of the support wafer 721 is not particularly limited.

FIG. 7(c) illustrates a process of grinding/polishing a back surface of the sensor wafer. A surface 731, which is the side opposite to the resonant type strain gauge element 611, of the sensor wafer 710 attached to the support wafer 721 is ground/polished to a desired thickness. At this time, polishing should be executed until a fracture layer or a grinding mark formed at the grinding process disappears.

In the sensor wafer 710 whose thickness is reduced, a concavo-convex pattern of the resonant-type strain gauge element 611 appears on the ground/polished surface which has been subjected to grinding/polishing as a concavo-convex pattern. The concavo-convex pattern of the ground/polished surface incurs a non-bonding portion at the time of bonding or incurs bonding distortion in a sensor. Thus, it is desirable to planarize the concavo-convex pattern of the element surface of the sensor wafer 710. Further, when the sensor wafer 710 is ground/polished to be 100 μm or less, a wafer easily gets cracked when handled in units of wafers. However, in a state in which the support wafer 721 is attached, handling is possible even in the sensor wafer 710 of several tens of μm or less.

After grinding/polishing, it is preferable that a cleaning process (not shown) be executed to increase cleanliness of the ground/polished surface. For example, physical cleaning ($CO_2$ cleaning or two-fluid cleaning) or acid and alkali cleaning is executed as the cleaning process. The cleaning process is executed at a temperature equal to or less than a temperature at which an attachment material is thermally decomposed, and it is necessary to use a chemical against which the material has chemical resistance.

FIG. 7(d) illustrates a process of forming a pattern on the back surface of the sensor wafer. A concave portion 742 is formed on the ground/polished surface by a photolithography technique using a resist, and the concave portion 742 is etched using a technique such as dry etching. After etching, the resist is removed, and thus a concave portion 742 is formed in the sensor wafer.

FIG. 7(e) illustrates a process of fabricating a base wafer. A pressure-conducting hole 741 is formed in a base wafer 740. The pressure-conducting hole 741 can be formed using any technique capable of forming the pressure-conducting hole such as plasma etching or wet etching. The hole can have any shape appropriate for a conducting hole.

FIG. 7(f) illustrates a process of directly bonding wafers. The base wafer 740 on which the pressure-conducting hole 741 is formed bonds with the sensor wafer 710 in which the concave portion 742 is formed. At this time, it is necessary to bond the base wafer with the sensor wafer at a temperature equal to or less than a heat-resistant temperature of an attachment material.

Specifically, a maximum temperature of an adhesive is about 100° C. to about 200° C., and is about 150° C. in the case of a double-sided tape. From a point of view of simplifying the process, it is desirable to execute the bonding process in a state in which a film forming process or a modifying process has not yet been performed on the ground/polished surface. Examples of a bonding process satisfying this condition include a room-temperature direct bonding process and a metal diffusion bonding process.

The room-temperature direct bonding process is performed under high vacuum condition after etching surfaces for the activation of bonding surfaces of wafers by an ion gun or a FAB gun. A feature of this technique lies in that a bonding process is performed at room temperature, and the surface is suitable for bonding between silicon and silicon. Further, gas emitted from an attachment material is attached to the surface again and causes bonding force to be significantly lowered. Thus, a material that does not emit gas should be selected as the attachment material.

The metal diffusion bonding process refers to a technique of attaching an atomic level metal layer on a substrate surface instead of increasing surface activity by etching as in the room-temperature direct bonding process. Similarly to the room-temperature direct bonding process, the bonding process is performed under high vacuum. In this bonding process, since a dissimilar material is very thinly attached at an atomic layer level, bonding can be performed without degrading characteristics of the pressure sensor.

Besides the above-mentioned techniques, a plasma activation bonding technique is used as a low-temperature bonding technique. The plasma activation bonding refers to a technique in which, in a state in which an OH group is arranged on the surface by plasma using a gas such as Ar, $N_2$, and $O_2$, surfaces are provisionally bonded (simply attached) to each other, and then bonding strength is increased by annealing at a temperature of about 400° C. In this technique, $H_2O$ generated due to an OH group at the time of bonding causes a void. However, in the structure having a small bonding area such as a diaphragm, $H_2O$ leaves the bonding interface, and excellent bonding causing no void can be implemented.

FIG. 7(g) illustrates a process of detaching the support wafer. The base wafer and the sensor wafer which is polished to a thin thickness and then directly bonded to the base wafer 740 are separated from the support wafer 721. A method of detaching the support wafer 721 differs according to a used adhesive. For example, in the case of a thermoplastic adhesive, detaching is performed by sliding the support wafer in a state in which heat is applied.

Further, in the case of a thermal detaching type double-sided tape, detaching can be simply made by applying heat. Although not shown, after detaching, in order to remove a residue of the attachment material, it is desirable to clean the sensor element surface by spin cleaning, chemical immersion, or the like.

FIG. 7(h) illustrates a dicing process. As a final process on a wafer, a process of dicing a bonded wafer 760 from which the support wafer is detached is performed. As a result, the resonant pressure sensor 600 is completed.

As a result, the thickness of the diaphragm 612 is adjusted for each wafer by fine adjustment of the grinding/polishing amount and dry etching, and thus the thickness can be easily controlled with micron to submicron accuracy. Accordingly, the resonant pressure sensor in which a variation in sensitivity can be suppressed is provided.

Since a dissimilar material is not used for bonding, the bonding portion can have a breaking strength equal to a base material strength of silicon. Thus, the resonant pressure sensor having excellent breakage pressure-resistance characteristics is provided. Further, since thermal distortion caused by a difference in a thermal expansion coefficient is suppressed, the resonant pressure sensor having excellent temperature characteristics is provided.

Further, the resonant pressure sensor in which an internal residual strain between dissimilar materials caused by temperature and pressure history is suppressed, and the structure having no hysteresis can be implemented is provided.

Since it is possible to decide a gap according to the depth of the concave portion of the sensor substrate, the thickness of the diaphragm can be easily controlled with micron to submicron accuracy between the concave portion 635 of the sensor substrate and the base substrate. Further, since an etching amount is small, the accuracy can be controlled with a high degree of submicron accuracy. As a result, the resonant pressure sensor in which the resonance of the diaphragm 612 can be prevented, the movable range of diaphragm is not restricted due to foreign substances, and characteristics such as input output characteristics are excellent is provided.

In addition, when isotropic etching using plasma is used, the fabricating process can be simplified, and a stress-concentrated portion on the periphery of the diaphragm can be rounded, so that the breakage pressure-resistance increases. Accordingly, the resonant pressure sensor which is low in cost and high in sensitivity is provided.

The shape of the concave portion 635 (for example, several tens of μm or less) of the sensor substrate 610 becomes the shape of the diaphragm 612 as is. Thus, compared to the case the diaphragm is formed by performing deep anisotropic etching using an alkaline solution from the back surface of the substrate on which the resonant-type strain gauge element 611 is formed, the size or the shape of a diaphragm is not restricted by the crystal surface (111). Accordingly, it is possible to fabricate a flexible shape which is not restricted by the crystal orientation such as a circular shape.

Particularly, when isotropic etching using plasma is used, the fabricating process can be simplified, and a stress-concentrated portion on the periphery of the diaphragm can be rounded, so that the breakage pressure-resistance increases. Accordingly, the resonant pressure sensor which is low in cost and high in sensitivity is provided.

In addition, since the thickness of the diaphragm is decided by the grinding/polishing process and plasma etching, unlike the deep alkaline etching, a method of fabricating a resonant pressure sensor, which does not need a mask variation for the difference in the diaphragm shape caused by the depth of etching is unnecessary, is provided.

In other words, unlike alkaline etching, even when a wafer having a large inch size (8 inches, 12 inches, or the like) is used form the commercialization using a trial fabrication result by a wafer having a small inch size (a 4-inch wafer or the like), the same mask pattern and the same process can be applied, and thus transfer to mass production can be efficiently performed.

Thus, a method of fabricating a resonant pressure sensor without depending on an inch size is provided. Similarly, even with requests to change the shape or the thickness of the diaphragm according to the pressure range, the diaphragm using the above-described bonding process can be formed by the same mask and the same process without depending on the shape or the thickness of the diaphragm.

The process of fabricating a diaphragm in which silicon wafers bond directly with each other such as the room-temperature direct bonding process or the metal diffusion bonding process is performed at a temperature lower than a heat-resistance temperature of a metallic interconnection formed on the sensor wafer 710. Thus, the bonding process can be performed in a state in which the metallic interconnection process of the resonant-type strain gauge element 611 has been completed. Further, since the process of fabricating a diaphragm such as the room-temperature direct bonding process or the metal diffusion bonding process can be performed at a temperature of, for example, about 400° C. or less, a creep of silicon or thermal distortion that affects characteristics of a pressure sensor does not remain. Thus, a method of fabricating a resonant pressure sensor having excellent characteristics is provided.

Third Preferred Embodiment

Figure 9:
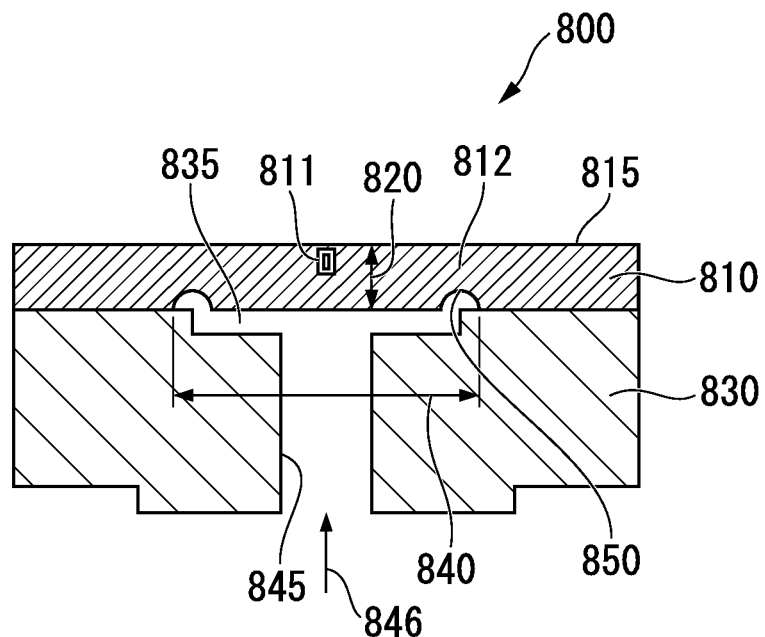
FIG. 9 is an explanatory diagram illustrating a configuration of a resonant pressure sensor in accordance with a third preferred embodiment of the present invention.
Figure 10:
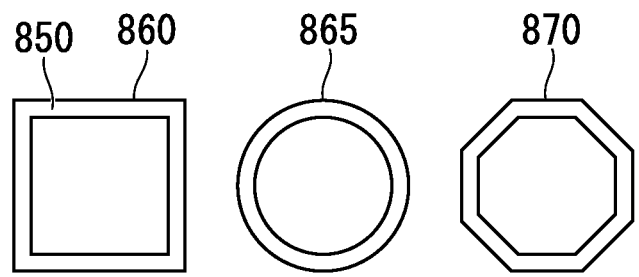
FIG. 10 is an explanatory diagram illustrating shapes of the diaphragm illustrated in FIG. 9.

FIG. 9 is an explanatory diagram illustrating a configuration of a resonant pressure sensor in accordance with a third preferred embodiment of the present invention. FIG. 10 is an explanatory diagram illustrating a shapes of the diaphragm illustrated in FIG. 9.

The resonant pressure sensor 800 includes a sensor substrate 810 and a base substrate 830. A conducting hole 845 is formed in the base substrate 830 by plasma etching, alkaline etching, or the like. The conducting hole 845 can have any shape appropriate for a conducting hole. A resonant-type strain gauge element 811 is fabricated on an upper surface 815 of the diaphragm.

The thickness of the diaphragm is decided depending on the thickness of the sensor substrate 810. For this reason, the thickness 820 of the diaphragm is adjusted such that grinding/polishing is performed up to a desired thickness. Since the grinding/polishing amount can be finely adjusted for each wafer, the thickness of each wafer can be controlled in units of μm with a high degree of accuracy.

The sensor substrate 810 and the base substrate 830 are made of silicon, and bonding of the substrates is performed without using an oxide film or any other dissimilar material. For this reason, a breaking strength equal to a base material strength of silicon can be realized even on the bounded interface. In addition, the sensor having excellent temperature characteristics can be implemented.

The concave portion 835 of the base substrate 830 is provided as a gap formed by bonding. The gap is formed by plasma etching, wet etching, or the like. Since the gap need not be subjected to deep etching using an alkaline chemical (KOH, TMAH, and the like), a gap of less than 1 μm to several tens of μm or less can be formed with a high degree of accuracy. Thus, a degree of freedom can be given to a design of a gap in which foreign substances are considered or a design of a gap in which the movable range of the diaphragm 812 is considered.

A dimension of the diaphragm 812 can be set to a dimension 840 of the concave portion of the base substrate 830. A quadrangular shape 860, a circular shape 865, a polygonal shape 870, or the like may be used as a concrete shape of the concave portion 835 as illustrated in FIG. 10. Since the concave portion 835 of the base substrate 830 is a small gap of less than 1 μm to several tens of μm or less, there is no restriction on the shape of the mask pattern by the plane orientation by etching, unlike a method of forming a diaphragm by deep etching using an alkaline chemical (KOH, TMAH, or the like).

Thus, the shape of the concave portion 835 can be freely designed without being restricted by the crystal orientation of the diaphragm. A ring-like rounding portion 850 formed in the sensor substrate 810 can mitigate stress concentration on the diaphragm, and thus breakage pressure-resistance can be improved.

Figure 11:
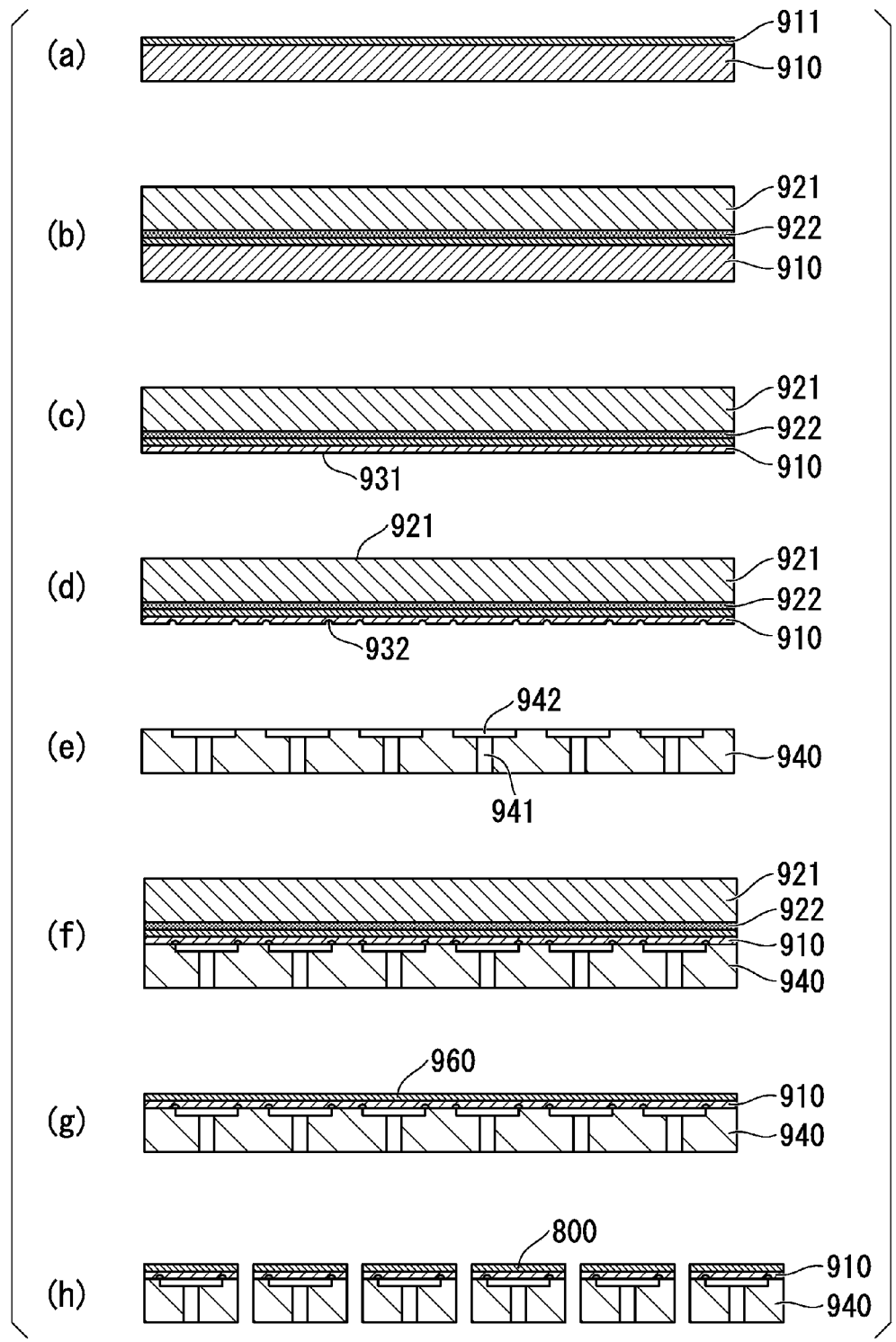
FIGS. 11(a) to 11(h) are explanatory diagrams illustrating a process of fabricating the resonant pressure sensor illustrated in FIG. 9 in accordance with the third preferred embodiment of the present invention.
Figure 12:
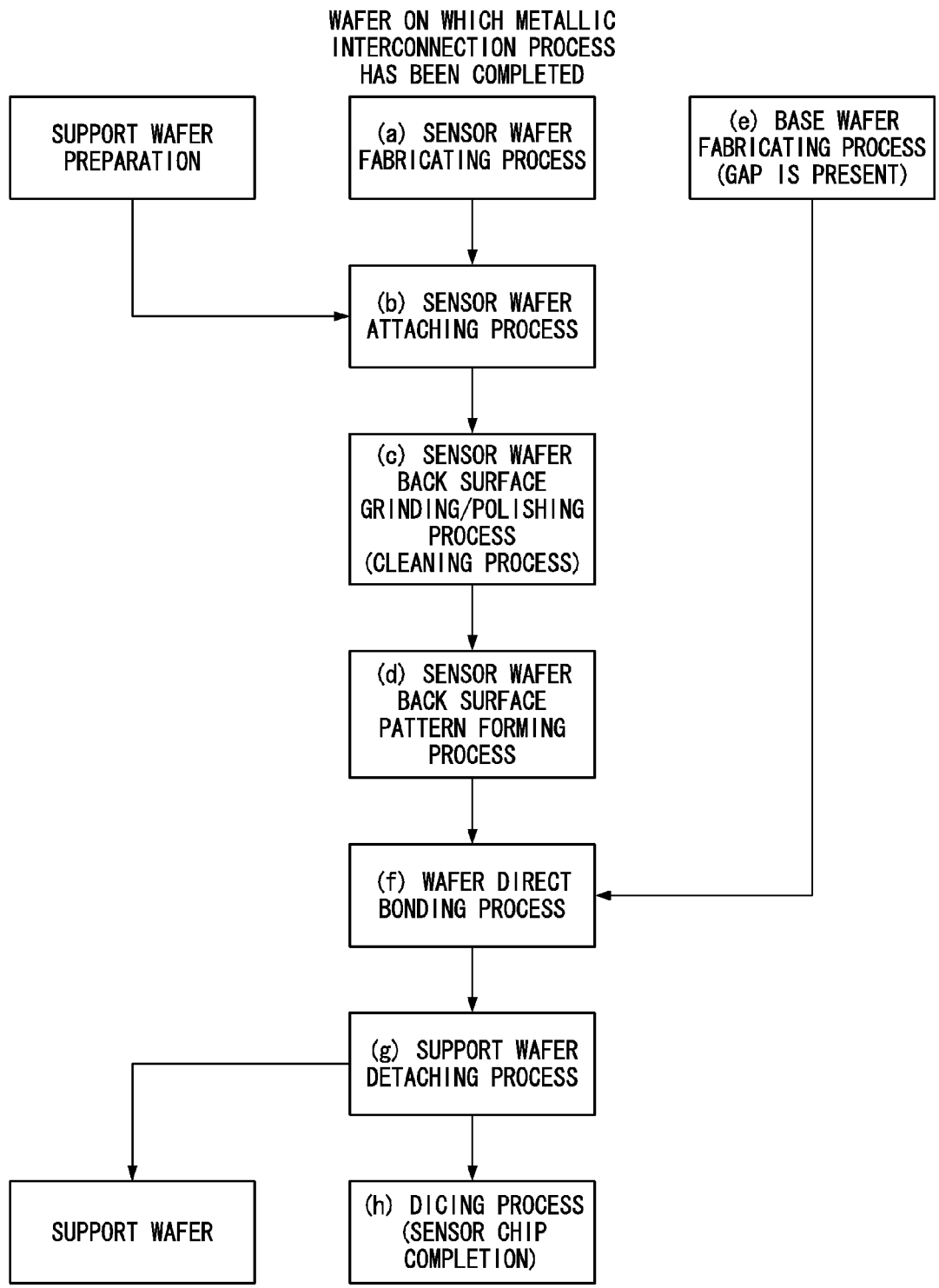
FIG. 12 is an explanatory diagram illustrating a process flowchart of the fabricating process illustrated in FIG. 11.
Figure 13:
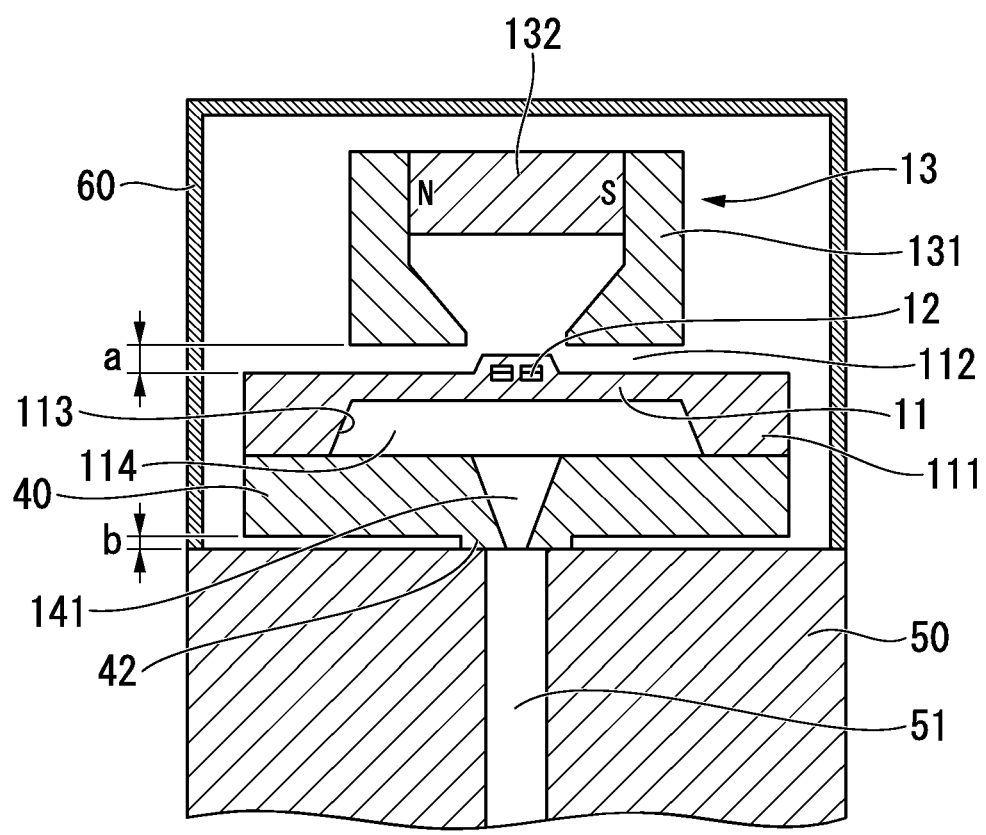
FIG. 13 is an explanatory diagram illustrating a main part of a resonant pressure sensor according to the related art.
Figure 14:
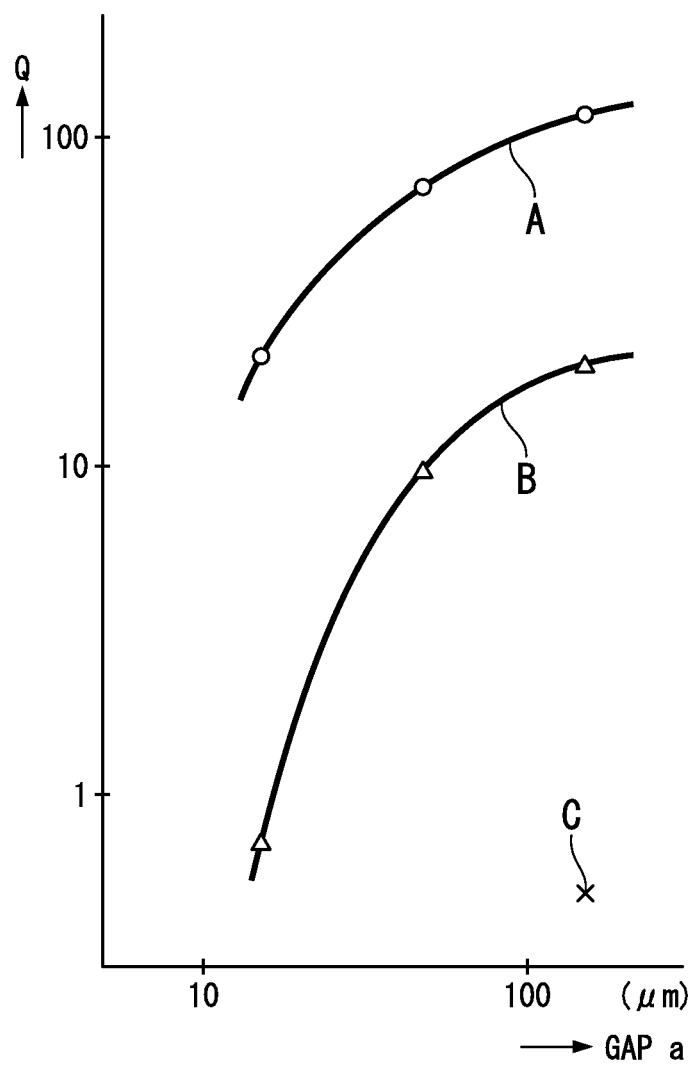
FIG. 14 illustrates an example in which a relation between Q and the gap a of the diaphragm 11 is actually measured in various kinds of fluids.
Figure 15:
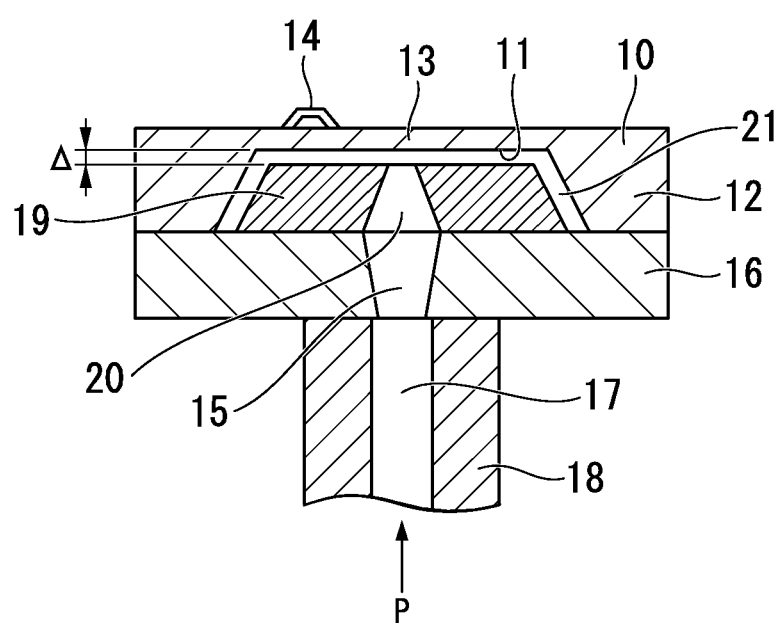
FIG. 15 is an explanatory diagram illustrating a main part of a resonant pressure sensor according to the related art.
Figure 16:
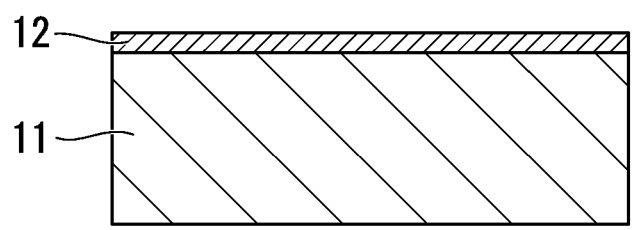
FIGS. 16 to 23 are explanatory diagrams illustrating a main part of a resonant pressure sensor in accordance with the related art.
Figure 17:
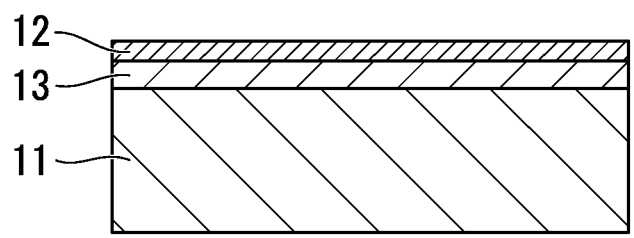
Figure 18:
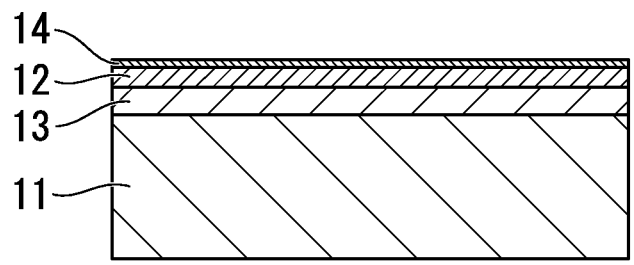
Figure 19:
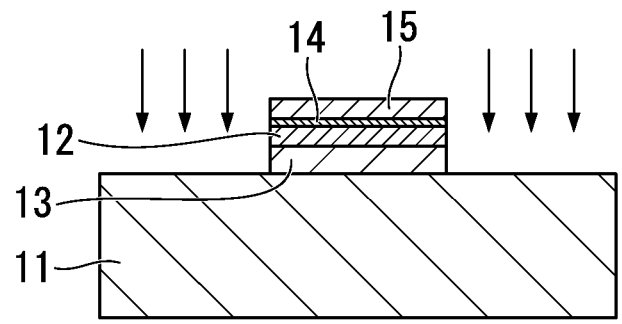
Figure 20:
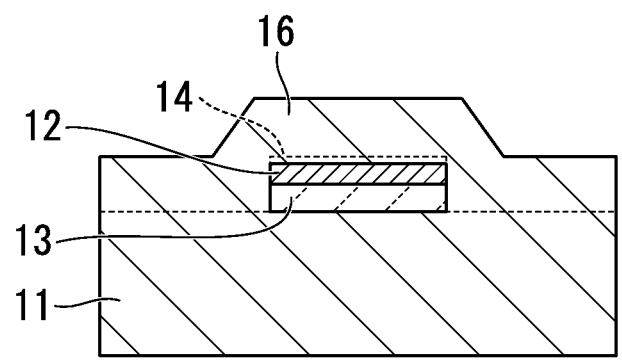
Figure 21:
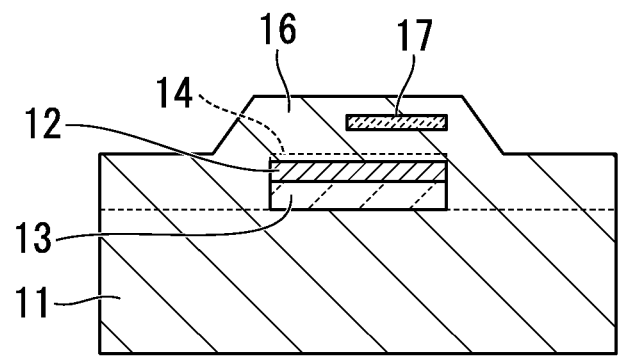
Figure 22:
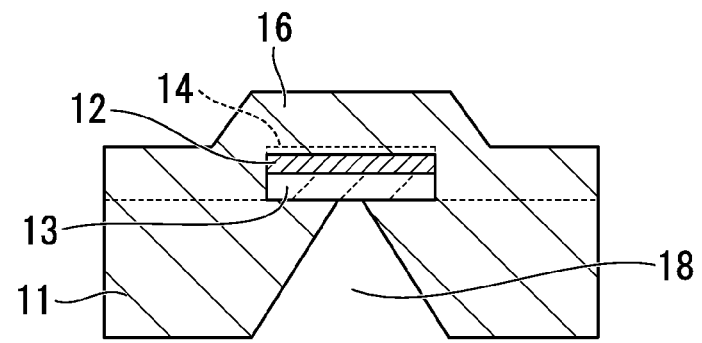
Figure 23:
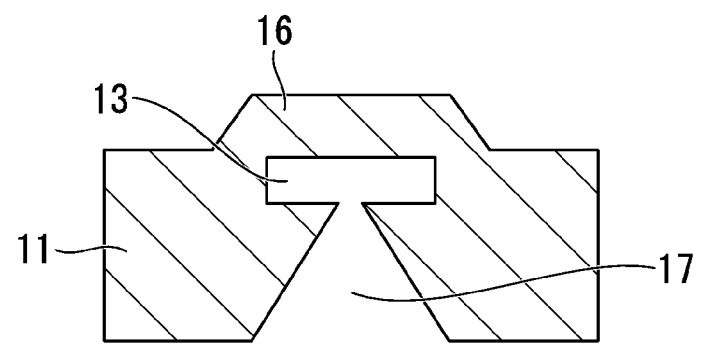
Figure 24:
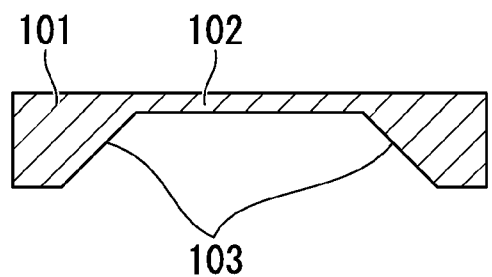
FIG. 24 is an explanatory diagram illustrating a main part of a resonant pressure sensor in accordance with the related art.
Figure 25:
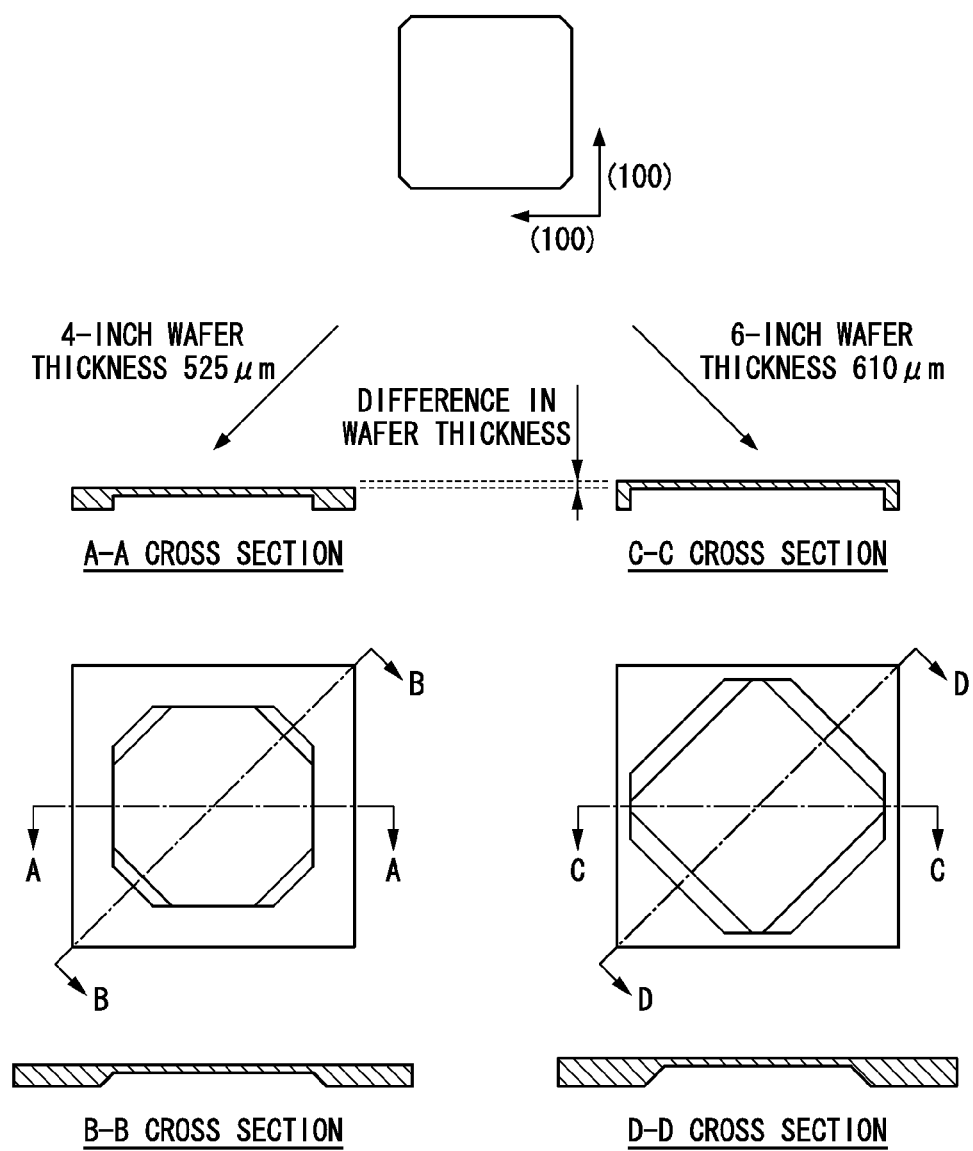
FIG. 25 is an explanatory diagram illustrating a main part of a resonant pressure sensor in accordance with the related art.

FIG. 11 is an explanatory diagram illustrating a process of fabricating the resonant pressure sensor illustrated in FIG. 9 in accordance with the third preferred embodiment of the present invention. FIG. 12 is an explanatory diagram illustrating a process flowchart of the fabricating process illustrated in FIG. 11.

FIG. 11(a) represents a process of fabricating a sensor wafer 910. The sensor wafer 910 which has been subjected to this process includes the resonant-type strain gauge element 811 formed on one surface 911 thereof. That is, the sensor wafer 910 is a wafer on which the resonant-type strain gauge element 811 and a metallic interconnection have already been formed. In other words, since processing of the surface 911 on which the resonant-type strain gauge element 811 is disposed has already been completed, the processing in a subsequent process is unnecessary.

FIG. 11(b) illustrates a process of attaching the sensor wafer 910. A support wafer 921 is attached to an element surface of the sensor wafer 910 using an attachment material 922. Examples of the attachment material 922 include a thermoplastic adhesive, a chemical solution type adhesive, a UV adhesive, a double-sided tape, and a WAX.

Since the attachment accuracy affects a variation in thickness in a subsequent grinding/polishing process, it is necessary to control a TTV (a difference between a maximum value and a minimum value of a wafer in-plane thickness) and bending. The support wafer 921 is made of a material such as sapphire, glass, silicon, and the like. The shape of the support wafer is not particularly limited.

FIG. 11(c) illustrates a process of grinding/polishing a back surface of the sensor wafer. A surface 931, which is the side opposite to the resonant type strain gauge elements 411, of the sensor wafer 910 attached to the support wafer 921 is ground/polished to a desired thickness. At this time, polishing should be executed until a fracture or a grinding mark formed at the grinding process disappears.

In the sensor wafer 910 whose thickness is reduced, a concavo-convex pattern of the resonant-type strain gauge element 811 appears on the ground/polished surface which has been subjected to grinding/polishing as a concavo-convex portion and a pattern. The concavo-convex portion of the ground/polished surface incurs a non-bonding portion at the time of bonding or incurs bonding distortion in a sensor. Thus, it is desirable to planarize the concavo-convex pattern of the element surface of the sensor wafer 910. Further, when the sensor wafer 910 is ground/polished to be 100 μm or less, a wafer easily gets cracked when handled in units of wafers. However, in a state in which the support wafer 921 is attached, handling is possible even in a wafer of several tens of μm or less.

After grinding/polishing, it is preferable that a cleaning process (not shown) be executed to increase cleanliness of the ground/polished surface. For example, physical cleaning ($CO_2$ cleaning or two-fluid cleaning) or acid and alkali cleaning is executed as the cleaning process. The cleaning process is executed at a temperature equal to or less than a heat-resistant temperature of an attachment material, and it is necessary to use a chemical against which the material has chemical resistance.

FIG. 11(d) illustrates a process of forming a pattern on the back surface of the sensor wafer. A concave portion is formed on the ground/polished surface by a photolithography technique using a resist, and the concave portion is etched using a technique such as dry etching. After etching, the resist is removed, and thus the rounding portion 932 of the sensor wafer is formed.

FIG. 11(e) illustrates a process of fabricating a base wafer. A pressure-conducting hole 941 and a concave portion 942 are formed in a base wafer 940. The base wafer 940 can be subjected to any technique capable of forming a pressure-conducting hole such as plasma etching or wet etching. The hole can have any shape appropriate for a conducting hole. Similarly, the concave portion 942 is formed using plasma etching, wet etching, or the like.

FIG. 11(f) illustrates a process of directly bonding wafers. The base wafer 940 on which the pressure-conducting hole 941 and the concave portion 942 are formed bonds with the sensor wafer 910 in which the rounding portion 932 is formed. At this time, it is necessary to bond the base wafer 940 with the sensor wafer 910 at a temperature equal to or less than a heat-resistant temperature of an attachment material.

Specifically, a maximum temperature of an adhesive is about 100° C. to about 200° C., and is about 150° C. in the case of a double-sided tape. From a point of view of simplifying the process, it is desirable to execute the bonding process in a state in which a film forming process or a modifying process has not yet been performed on the ground/polished surface. Examples of a bonding process satisfying this condition include a room-temperature direct bonding process and a metal diffusion bonding process.

The room-temperature direct bonding process is performed under high vacuum condition after etching surface for the activation of bonding surfaces of wafers by an ion gun or a FAB gun. A feature of this technique lies in that a bonding process is performed at room temperature, and the surface is suitable for bonding between silicon and silicon. Further, gas emitted from an attachment material is attached to the surface again and causes bonding force to be significantly lowered. Thus, a material that does not emit gas should be selected as the attachment material.

The metal diffusion bonding process refers to a technique of attaching an atomic level metal layer on a substrate surface at instead of increasing surface activity by etching as in the room-temperature direct bonding process. Similarly to the room-temperature direct bonding process, the bonding process is performed under high vacuum. In this bonding process, since a dissimilar material is very thinly attached at an atomic layer level, bonding can be performed without degrading characteristics of the pressure sensor.

Besides the above-mentioned techniques, a plasma activation bonding technique is used as a low-temperature bonding technique. The plasma activation bonding is performed such that, in a state in which an OH group is arranged on the surface by plasma using a gas such as Ar, $N_2$, and $O_2$, surfaces are provisionally bonded (simply attached) to each other, and then bonding strength is increased by annealing at a temperature of about 400° C. In this technique, $H_2O$ generated due to an OH group causes a void. However, in the structure having a small bonding area such as a diaphragm, $H_2O$ leaves the bonding interface, and excellent bonding causing no void can be implemented.

FIG. 11(g) illustrates a process of detaching the support wafer 921. The base wafer 940 and the sensor wafer 910 which is polished to have a thin thickness and then directly bond to the base wafer 940 are separated from the support wafer 921. A method of detaching the support wafer 921 differs according to a used adhesive. For example, in the case of a thermoplastic adhesive, detaching is performed by sliding the support wafer in a state in which heat is applied.

Further, in the case of a thermal detaching type double-sided tape, detaching can be simply made by applying heat. Although not shown, after detaching, in order to remove a residue of the attachment material, it is desirable to clean the sensor element surface by spin cleaning, chemical immersion, or the like.

FIG. 11(h) illustrates a dicing process. As a final process on a wafer, a process of dicing a bonded wafer 960 from which the support wafer 921 is detached is performed. As a result, the resonant pressure sensor 800 is completed.

As a result, in the third preferred embodiment illustrated in FIG. 9, it is possible to implement the structure in which stress concentration on the diaphragm 812 can be suppressed without reducing the effect of the first preferred embodiment illustrated in FIG. 1.

According to the present invention, the following effects are obtained. The thickness of the diaphragm 812 can be adjusted by the grinding/polishing process before the bonding process. Thus, the thickness can be easily controlled with micron to submicron accuracy. Accordingly, the resonant pressure sensor in which a variation in sensitivity can be suppressed is provided.

Since a dissimilar material is not used for bonding, the bonding portion can have a breaking strength equal to a base material strength of silicon. Thus, the resonant pressure sensor having excellent breakage pressure-resistance characteristics is provided. Further, since thermal distortion caused by a difference in a thermal expansion coefficient is suppressed, the resonant pressure sensor having excellent temperature characteristics is provided.

Further, the resonant pressure sensor in which an internal residual strain between dissimilar materials caused by temperature and pressure history is suppressed, and the structure having no hysteresis can be implemented is provided. Since it is possible to decide a gap according to the depth of the concave portion 835 of the base wafer, for example, a gap of several tens of μm to less than 1 μm can be formed between the concave portion 835 of the base substrate and the diaphragm 812. Further, since an etching amount is small, the accuracy can be controlled with a high degree of submicron accuracy.

As a result, the resonant pressure sensor in which the resonance of the diaphragm 812 can be prevented, the movable range of diaphragm is not restricted due to foreign substances, and characteristics such as input output characteristics are excellent is provided. In addition, when isotropic etching using plasma is used, the fabricating process can be simplified, and a stress-concentrated portion on the periphery of the diaphragm can be rounded, so that the breakage pressure-resistance increases. Accordingly, the resonant pressure sensor which is low in cost and high in sensitivity is provided.

The shape of the concave portion 835 (for example, several tens of μm or less) of the base substrate 830 becomes the shape of the diaphragm 812 as is. Thus, compared to when the diaphragm is formed by performing deep anisotropic etching using an alkaline solution from the back surface of the wafer on which an element is formed, the size or the shape of a diaphragm is not restricted by the crystal surface (111). Accordingly, it is possible to fabricate the flexible shape which is not restricted by the crystal orientation such as the circular shape.

Particularly, when isotropic etching using plasma is used, the resonant pressure sensor that is simple in a fabricating process, low in cost, and high in sensitivity is provided.

In addition, since the thickness of the diaphragm 812 is decided by the grinding/polishing process, unlike the deep alkaline etching, a mask variation for the difference in the diaphragm shape caused by the depth of etching is unnecessary.

In other words, unlike alkaline etching, even when a wafer having a large inch size (8 inches, 12 inches, or the like) is used for the commercialization using a trial fabrication result by a wafer having a small inch size (a 4-inch wafer or the like), the same mask pattern and the same process can be applied, and thus transfer to mass production can be efficiently performed. Thus, a method of fabricating a resonant pressure sensor without depending on an inch size is provided. Similarly, even with requests to change the shape or the thickness of the diaphragm 812 according to the pressure range, the diaphragm 812 using the bonding process such as the above-described room-temperature direct bonding process or metal diffusion bonding process can be formed by the same mask and the same process without depending on the shape or the thickness of the diaphragm 812.

The process of fabricating the diaphragm 812 in which silicon wafers bond directly with each other such as the room-temperature direct bonding process or the metal diffusion bonding process is performed at a temperature lower than a heat-resistance temperature of a metallic interconnection formed on the sensor wafer 910. Thus, the bonding process can be performed in a state in which the metallic interconnection process of the resonant-type strain gauge element has been completed.

Further, the process of fabricating a diaphragm such that the room-temperature direct bonding process or the metal diffusion bonding process can be performed at a temperature of, for example, about 400° C. or less. Thus, a creep of silicon or thermal distortion that affects characteristics of a pressure sensor does not remain. Thus, a method of fabricating a resonant pressure sensor having excellent characteristics is provided.

As used herein, the following directional terms "forward, rearward, above, downward, right, left, vertical, horizontal, below, transverse, row and column" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A resonant pressure sensor including one or more resonant-type strain gauges arranged on a diaphragm, the resonant pressure sensor comprising:

a sensor substrate that is made of silicon and includes one surface on which one or more resonant-type strain gauge elements are arranged and the other surface which is polished to have a thickness corresponding to the diaphragm;

a base substrate that is made of silicon and includes one surface directly bonded with the other surface of the sensor substrate;

a concave portion that is formed in a portion of the base substrate that bonds with the sensor substrate, functions as the diaphragm in the sensor substrate, and includes a predetermined gap that does not restrict a movable range of the diaphragm due to foreign substances and suppresses vibration of the diaphragm excited by vibration of the resonant-type strain gauge elements;

one or more conducting holes that conduct measuring pressure to the concave portion; and a fluid that propagates pressure to the concave portion through the conducting hole and suppresses vibration of the diaphragm.

2. The resonant pressure sensor according to claim 1, wherein
bonding between the sensor substrate and the base substrate is performed without using an oxide film or any other dissimilar material.

3. The resonant pressure sensor according to claim 1, wherein
the concave portion is formed by one of plasma etching and wet etching.

4. The resonant pressure sensor according to claim 1, wherein
a shape of the concave portion is one of quadrangular shape, a circular shape, and a polygonal shape.

5. The resonant pressure sensor according to claim 1, wherein
the concave portion is a small gap of less than 1 μm to several tens of μm or less.

6. A resonant pressure sensor including one or more resonant-type strain gauges arranged on a diaphragm, the resonant pressure sensor comprising:

a sensor substrate that is made of silicon and includes one surface on which one or more resonant-type strain gauge elements are arranged and the other surface which is polished to have a thickness corresponding to the diaphragm;

a base substrate that is made of silicon and includes one surface directly bonded with the other surface of the sensor substrate;

a concave portion that is formed in a portion of the sensor substrate that bonds with the base substrate, functions as the diaphragm in the sensor substrate, and includes a predetermined gap that does not restrict a movable range of the diaphragm due to foreign substances and suppresses vibration of the diaphragm excited by vibration of the resonant-type strain gauge elements;

one or more conducting holes that conduct measuring pressure to the concave portion; and a fluid that propagates pressure to the concave portion through the conducting hole and suppresses vibration of the diaphragm.

7. The resonant pressure sensor according to claim 6, wherein
bonding between the sensor substrate and the base substrate is performed without using an oxide film or any other dissimilar material.

8. The resonant pressure sensor according to claim 6, wherein
the concave portion is formed by one of plasma etching and wet etching.

9. The resonant pressure sensor according to claim 6, wherein
a shape of the concave portion is one of quadrangular shape, a circular shape, and a polygonal shape.

10. The resonant pressure sensor according to claim 6, wherein
the concave portion is a small gap of less than 1 μm to several tens of μm or less.

11. A method of fabricating a resonant pressure sensor in which one or more resonant-type strain gauges are formed in a diaphragm, the method comprising:

forming one or more resonant-type strain gauge elements on one surface of a sensor wafer;

attaching the surface of the sensor wafer to one surface of a support wafer;

grinding and polishing the other surface of the sensor wafer to have a thickness corresponding to a diaphragm;

forming a concave portion having a predetermined gap in one surface of a base wafer;

directly bonding the other surface of the sensor wafer with one surface of the base wafer;

detaching the support wafer from the sensor wafer; and dicing the bounded wafer.

12. The method of fabricating a resonant pressure sensor according to claim 11, wherein
the bonding of the sensor wafer to the base wafer is performed without using an oxide film or any other dissimilar material.

13. The method of fabricating a resonant pressure sensor according to claim 11, wherein
the forming of the concave portion is performed by one of plasma etching and wet etching.

14. The method of fabricating a resonant pressure sensor according to claim 11, wherein
a shape of the concave portion is one of quadrangular shape, a circular shape, and a polygonal shape.

15. The method of fabricating a resonant pressure sensor according to claim 11, wherein
the concave portion is a small gap of less than 1 μm to several tens of μm or less.

16. A method of fabricating a resonant pressure sensor in which one or more resonant-type strain gauges are formed in a diaphragm, the method comprising:

forming one or more resonant-type strain gauge elements on one surface of a sensor wafer;

attaching the surface of the sensor wafer to one surface of a support wafer;

grinding and polishing the other surface of the sensor wafer to have a thickness corresponding to a diaphragm;

forming a concave portion having a predetermined gap in one surface of the sensor wafer;

directly bonding the other surface of the sensor wafer with one surface of the base wafer;

detaching the support wafer from the sensor wafer; and dicing the bounded wafer.

17. The method of fabricating a resonant pressure sensor according to claim 16, wherein
the bonding of the sensor wafer to the base wafer is performed without using an oxide film or any other dissimilar material.

18. The method of fabricating a resonant pressure sensor according to claim 16, wherein
the forming of the concave portion is performed by one of plasma etching and wet etching.

19. The method of fabricating a resonant pressure sensor according to claim 16, wherein
a shape of the concave portion is one of quadrangular shape, a circular shape, and a polygonal shape.

20. The method of fabricating a resonant pressure sensor according to claim 16, wherein
the concave portion is a small gap of less than 1 μm to several tens of μm or less.

21. The resonant pressure sensor according to claim 1, further comprising:
a part of a surface of the concave portion forms the gap with the ground and polished surface opposite to the element surface on which the resonant-type strain gauge elements are arranged.

22. The resonant pressure sensor according to claim 6, further comprising:
a part of a surface of the concave portion forms the gap with a surface of the base substrate that bonds directly with the ground and polished surface opposite to the element surface on which the resonant-type strain gauge elements are arranged.

23. The method of fabricating a resonant pressure sensor according to claim 11, further comprising:
forming, by a part of a surface of the concave portion, the gap with the ground and polished surface opposite to the element surface on which the resonant-type strain gauge elements are arranged.

24. The method of fabricating a resonant pressure sensor according to claim 16, further comprising:
forming, by a part of a surface of the concave portion, the gap with a surface of the base substrate that bonds directly with the ground and polished surface opposite to the element surface on which the resonant-type strain gauge elements are arranged.

* * * * *